(12) United States Patent
Khandani

(10) Patent No.: US 9,572,038 B2
(45) Date of Patent: Feb. 14, 2017

(54) FULL DUPLEX WIRELESS TRANSMISSION WITH CHANNEL PHASE-BASED ENCRYPTION

(71) Applicant: Amir Keyvan Khandani, Kitchener, CA (US)

(72) Inventor: Amir Keyvan Khandani, Kitchener, CA (US)

(*) Notice: Subject to any disclaimer, the term of this patent is extended or adjusted under 35 U.S.C. 154(b) by 46 days.

(21) Appl. No.: 13/893,297

(22) Filed: May 13, 2013

(65) Prior Publication Data

US 2013/0301688 A1    Nov. 14, 2013

Related U.S. Application Data

(60) Provisional application No. 61/646,312, filed on May 13, 2012, provisional application No. 61/771,815, filed on Mar. 2, 2013.

(51) Int. Cl.
| | | |
|---|---|---|
| *H04B 7/10* | (2006.01) | |
| *H04W 16/14* | (2009.01) | |
| *H04B 7/04* | (2006.01) | |
| *H04L 5/14* | (2006.01) | |
| *H04W 12/04* | (2009.01) | |

(Continued)

(52) U.S. Cl.
CPC ............ *H04W 16/14* (2013.01); *H04B 1/123* (2013.01); *H04B 1/525* (2013.01); *H04B 7/026* (2013.01); *H04B 7/0413* (2013.01); *H04B 7/0478* (2013.01); *H04L 1/18* (2013.01); *H04L 1/1825* (2013.01); *H04L 1/1896* (2013.01); *H04L 5/14* (2013.01); *H04W 12/04* (2013.01); *H04B 7/0417* (2013.01); *H04B 7/0626* (2013.01);

(Continued)

(58) Field of Classification Search
CPC ..... H04L 5/14; H04W 12/04; H04W 52/0212; H04B 7/0682; H04B 7/0617; H04B 7/0404; H04B 7/0671
USPC ...... 375/219, 224, 297–298, 376; 455/114.3, 455/126, 127.2, 260
See application file for complete search history.

(56) References Cited

U.S. PATENT DOCUMENTS

| | | |
|---|---|---|
| 4,750,165 A | 6/1988 | Champagne |
| 5,383,224 A | 1/1995 | Mizoguchi |

(Continued)

FOREIGN PATENT DOCUMENTS

| | | |
|---|---|---|
| GB | 1091437 | 11/1967 |
| JP | 10502220 A | 2/1998 |

(Continued)

OTHER PUBLICATIONS

International Search Report for PCT/US2013/040821 mailed Jul. 19, 2013.

(Continued)

*Primary Examiner* — Daniel Washburn
*Assistant Examiner* — Eboni Hughes
(74) *Attorney, Agent, or Firm* — Invention Mine LLC

(57) ABSTRACT

A method comprising: at a first transceiver, transmitting a plurality of signals to a second transceiver and receiving corresponding receive signals from the second transceiver, wherein each transmitted signal is sent using a channel perturbation; measuring a plurality of phase values, wherein each phase value is a phase difference between one of the plurality of transmitted signals and corresponding receive signal; masking a subsequent phase modulated signal employing phase rotation at the first transceiver using the plurality of phase values.

18 Claims, 15 Drawing Sheets

(51) Int. Cl.
*H04B 7/02* (2006.01)
*H04B 1/12* (2006.01)
*H04B 1/525* (2015.01)
*H04L 1/18* (2006.01)
*H04B 7/06* (2006.01)
*H04L 1/00* (2006.01)

(52) U.S. Cl.
CPC .............. *H04B 7/0669* (2013.01); *H04B 7/10* (2013.01); *H04L 2001/0097* (2013.01)

(56) References Cited

U.S. PATENT DOCUMENTS

| | | | |
|---|---|---|---|
| 5,691,978 A | 11/1997 | Kenworthy | |
| 6,608,864 B1 | 8/2003 | Strait | |
| 6,621,876 B2 | 9/2003 | Camp, Jr. | |
| 6,745,009 B2* | 6/2004 | Raghothaman | H04B 7/0636 455/63.1 |
| 6,917,597 B1 | 7/2005 | Schmidl | |
| 7,065,036 B1 | 6/2006 | Ryan | |
| 7,096,042 B2 | 8/2006 | Marinier | |
| 7,184,466 B1 | 2/2007 | Seemann | |
| 7,346,100 B2 | 3/2008 | Kumar | |
| 7,706,744 B2* | 4/2010 | Rodgers et al. | 455/11.1 |
| 7,817,641 B1* | 10/2010 | Khandani | 370/395.4 |
| 8,107,906 B2 | 1/2012 | Lum | |
| 8,208,628 B2 | 6/2012 | Yener | |
| 8,238,551 B2 | 8/2012 | Reznik et al. | |
| 8,280,046 B2 | 10/2012 | Rudolf et al. | |
| 8,401,196 B2 | 3/2013 | Goldberg et al. | |
| 8,976,641 B2 | 3/2015 | Choi | |
| 9,036,749 B2 | 5/2015 | Choi | |
| 9,054,795 B2 | 6/2015 | Choi | |
| 9,077,421 B1 | 7/2015 | Mehlman | |
| 2002/0032004 A1 | 3/2002 | Widrow | |
| 2003/0114128 A1 | 6/2003 | Haapoja | |
| 2003/0189975 A1 | 10/2003 | Fullerton | |
| 2004/0022229 A1 | 2/2004 | Vanness | |
| 2005/0057420 A1* | 3/2005 | Lin et al. | 343/818 |
| 2005/0083863 A1* | 4/2005 | Umei et al. | 370/299 |
| 2005/0275576 A1 | 12/2005 | Fudge | |
| 2006/0045063 A1 | 3/2006 | Stanford | |
| 2007/0026804 A1 | 2/2007 | Ishibashi | |
| 2007/0036353 A1 | 2/2007 | Reznik | |
| 2007/0063875 A1* | 3/2007 | Hoffberg | 340/995.1 |
| 2007/0082617 A1 | 4/2007 | McCallister | |
| 2007/0254692 A1 | 11/2007 | McCoy | |
| 2008/0009257 A1 | 1/2008 | Safarian | |
| 2008/0107046 A1 | 5/2008 | Kangasmaa et al. | |
| 2008/0123851 A1 | 5/2008 | Guccione | |
| 2009/0092072 A1 | 4/2009 | Imamura | |
| 2009/0141900 A1 | 6/2009 | Ye | |
| 2009/0186582 A1* | 7/2009 | Muhammad | H04B 1/525 455/63.1 |
| 2009/0213770 A1 | 8/2009 | Mu | |
| 2009/0253385 A1* | 10/2009 | Dent et al. | 455/83 |
| 2009/0284218 A1 | 11/2009 | Mohammadian | |
| 2010/0008406 A1 | 1/2010 | Sawai | |
| 2010/0020771 A1* | 1/2010 | Ji et al. | 370/336 |
| 2010/0022201 A1 | 1/2010 | Vandenameele | |
| 2010/0086012 A1 | 4/2010 | Rofougaran | |
| 2010/0232324 A1 | 9/2010 | Radunovic | |
| 2010/0248714 A1 | 9/2010 | Kang | |
| 2010/0271987 A1 | 10/2010 | Chiu | |
| 2011/0149714 A1 | 6/2011 | Rimini | |
| 2012/0087424 A1* | 4/2012 | Brown et al. | 375/260 |
| 2012/0159279 A1 | 6/2012 | Braithwaite | |
| 2012/0200158 A1 | 8/2012 | Takei | |
| 2012/0201153 A1 | 8/2012 | Bharadia et al. | |
| 2012/0201173 A1 | 8/2012 | Jain et al. | |
| 2012/0281834 A1 | 11/2012 | Reznik et al. | |
| 2012/0300680 A1 | 11/2012 | Pietsch | |
| 2013/0010851 A1 | 1/2013 | Jaeger | |
| 2013/0044791 A1 | 2/2013 | Rimini | |
| 2013/0301487 A1 | 11/2013 | Khandani | |
| 2014/0126675 A1 | 5/2014 | Monsen | |
| 2014/0135056 A1* | 5/2014 | Wang | 455/522 |
| 2014/0169236 A1 | 6/2014 | Choi | |
| 2014/0204808 A1 | 7/2014 | Choi | |
| 2014/0219139 A1 | 8/2014 | Choi | |
| 2015/0043323 A1 | 2/2015 | Choi | |
| 2015/0043685 A1 | 2/2015 | Choi | |
| 2015/0049834 A1 | 2/2015 | Choi | |
| 2015/0063176 A1 | 3/2015 | Hong | |
| 2015/0078217 A1 | 3/2015 | Choi | |
| 2015/0139284 A1 | 5/2015 | Choi | |
| 2015/0171903 A1 | 6/2015 | Mehlman | |
| 2015/0188646 A1 | 7/2015 | Bharadia | |
| 2015/0236750 A1 | 8/2015 | Choi | |
| 2015/0263780 A1 | 9/2015 | Mehlman | |
| 2015/0280893 A1 | 10/2015 | Choi | |
| 2015/0333847 A1 | 11/2015 | Bharadia | |
| 2015/0341125 A1 | 11/2015 | Bharadia | |

FOREIGN PATENT DOCUMENTS

| | | |
|---|---|---|
| KR | 1020040096404 | 11/2004 |
| KR | 1020070072629 | 7/2007 |
| KR | 1020120080231 | 7/2012 |
| WO | 9622643 | 7/1996 |
| WO | 2011065020 | 6/2002 |
| WO | 03098823 | 11/2003 |
| WO | 2010005951 | 1/2010 |
| WO | 2011148341 A1 | 12/2011 |

OTHER PUBLICATIONS

Suarez, Martha et al., RF and Microwave Band-Pass Passive Filters for Mobile Transceivers with a Focus on BAW Technology, Advanced Microwave and Millimeter Wave Technologies Semiconductor Devices Circuits and Systems, 2010, retrieved online at http://cdn.intechopen.com/pdfs/9981/InTech-RF_and_microwave_band_pass_passive_filters_for_mobile_transceivers_with_a_focus_on_baw_technology.pdf.
Chen, B., et al., "Quantization Index Modulation: A Class of Provably Good Methods for Digital Watermarking and Information Embedding", IEEE Transaction on Information Theory, vol. 47, No. 4, May 2001, pp. 1423-1443.
EP Extended European Search Report for EP App. No. 13790076.7, dated Mar. 2, 2016, 8 pages.
EP Extended Search Report for EP App. No., 13790160.9-1874, dated Jan. 16, 2016, 9 pages.
International Search Report and Written Opinion for PCT/US2013/040822 mailed Jul. 18, 2013.
International Search Report and Written Opinion for PCT/US2014/042136 mailed on Dec. 9, 2014.
International Search Report and Written Opinion for PCT/US2014/051137 mailed Nov. 24, 2014.
International Search Report and Written Opinion from PCT/US2014/050968 mailed on Nov. 19, 2014.
International Search Report for PCT/US2013/040818 mailed Jul. 24, 2013.
Jain, M., "Practical, Real-Time, Full Duplex Wireless", MobiCom '11, Sep. 19-23, 2011, Las Vegans, NC, USA, 2011, 12 pages.
Jung II, ., "Achieving single channel, full duplex wireless communication", Proceedings from the Annual International Conference on Mobile Computing and Networking, MOBICOM—MOBICOM' 10 and MOBIHOC' 10—Proceedings of the 16th Annual International Conference on Mobile Computing and Networking and 11th ACM International Symposi, Sep. 20, 2010, pp. 1-12, XP002696691.
McMichael, J. G., et al., "Optimal tuning of analog self-interference cancellers for full-duplex wireless communication". IEEE, Fiftieth Annual Allerton Conference, Oct. 1-5, 2012, p. 246-251.
Persson, D., et al., "Joint Source-Channel Coding for the MIMO Broadcast Channel", IEEE Transactions on Signal Processing, vol. 60, No. 4, Apr. 2012, pp. 2085-2090.
Provisional Application, entitled: "Adaptive Non-Linear Digital Cancellation for Full-Duplex Duplex Radios", U.S. Appl. No. 61/864,453, filed Aug. 9, 2013.

(56) References Cited

OTHER PUBLICATIONS

Provisional Application, entitled: "Cancellation Circuit With Variable Delay and Amplifier", U.S. Appl. No. 61/876,663, filed Sep. 11, 2013.
Provisional Application, entitled: "Feed Foward Signal Cancellation", U.S. Appl. No. 61/736,726, filed Dec. 13, 2012.
Provisional Application, entitled: "Frequency Independent Analog Cancellation Circuit", U.S. Appl. No. 61/864,459, filed Aug. 9, 2013.
Provisional Application, entitled: "Hybrid IF/RF Digital Cancellation Architectures for Full-Duplex Radios", U.S. Appl. No. 61/915,431, filed Dec. 12, 2013.
Provisional Application, entitled: "Interference Cancellation Architectures With Frequency Isolation", U.S. Appl. No. 62/030,240, filed Jul. 29, 2014.
Provisional Application, entitled: "Method and Apparatus for Mitigating Phase Noise to Improve Self-Interference Cancellation", U.S. Appl. No. 61/865,943, filed Aug. 14, 2013.
Provisional Application, entitled: "Near Band Cancellation", U.S. Appl. No. 61/970,852, filed Mar. 26, 2014.
Provisional Application, entitled: "Signal Cancellation Using Feedforward and Feedback", U.S. Appl. No. 61/760,518, filed Feb. 4, 2013.
Provisional Application, entitled: "Self Interference Cancellation Architecture for In-Band Full Duplex Relay Node", U.S. Appl. No. 61/871,519, filed Aug. 29, 2013.
Provisional Application, entitled: "Tunable Self Interference Cancellation", U.S. Appl. No. 61/950,742, filed Mar. 10, 2014.
Provisional Application, entitled: "Tuning Algorithm for Multi-Tap Signal Cancellation Circuit", U.S. Appl. No. 61/754,447, filed Jan. 18, 2013.
Provisional Application, entitled: "Techniques for Digital Interference Cancellation", U.S. Appl. No. 62/002,578, filed May 23, 2014.
Gharavol, E., et al., "Robust Joint Optimization of MIMO Two-Way Relay Channels With Imperfect CSI", Communication, Control, and Computing (Allerton), 2011 49th Annual Allerton Conference on, IEEE, Sep. 28, 2011, pp. 1657-1664, XP032085749, DOI: 10.1109/ALLERTON.2011.6120368, ISBN: 978-1-4577-1817-5.
Vaze, R., et al., "To Code or Not to Code in Multi-Hop Relay Channels", arxiv.org, Cornell University Library, May 20, 2008, XP080418936, 30 pages.
Extended European Search Report for EP App. 13790948.7, dated Nov. 4, 2015, 9 pages.

* cited by examiner

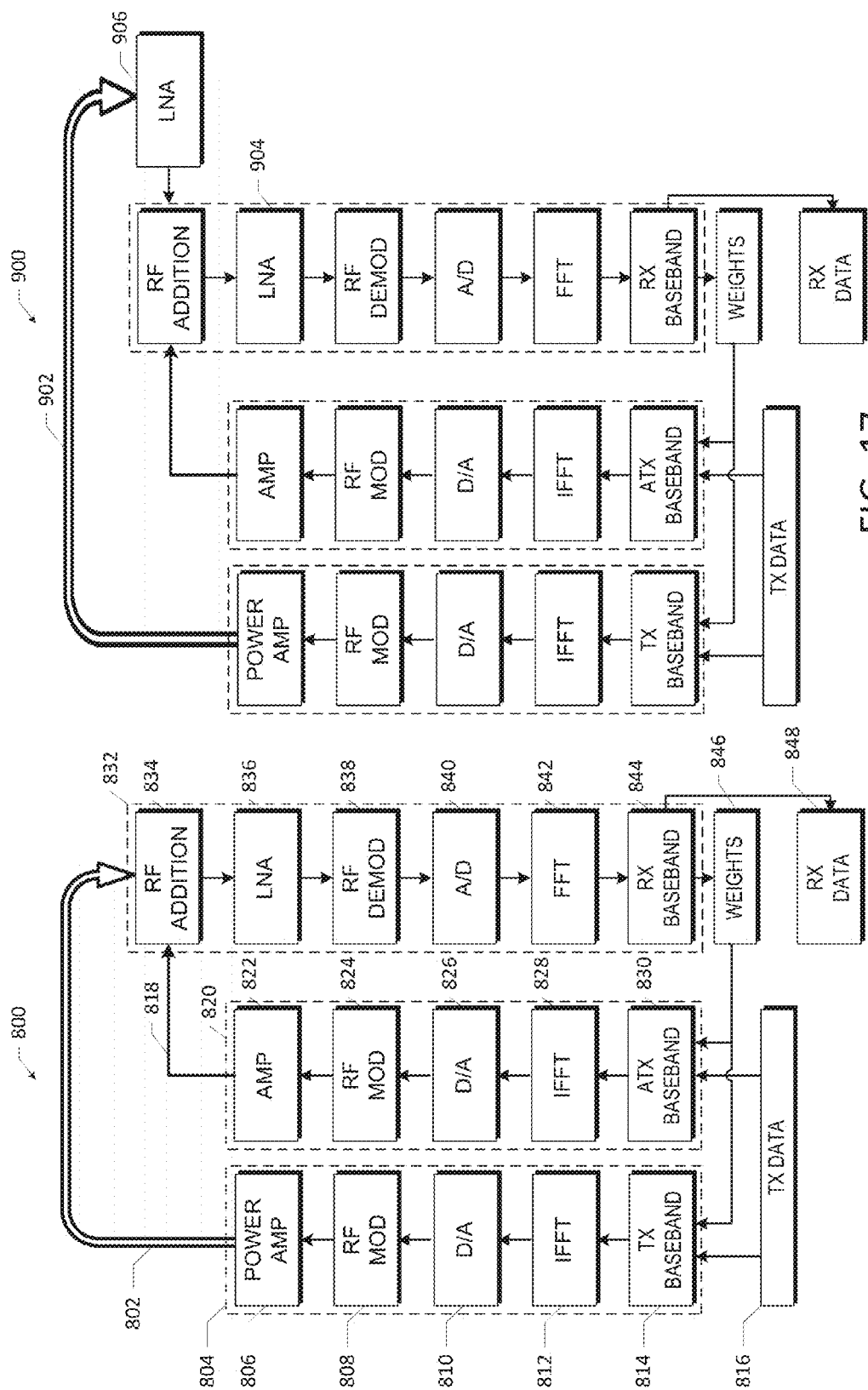

FULL DUPLEX WIRELESS TRANSMISSION WITH CHANNEL PHASE-BASED ENCRYPTION

CROSS-REFERENCE TO RELATED APPLICATIONS

The present application is a non-provisional filing of, and claims benefit under 35 U.S.C. §119(e) from, U.S. Provisional Patent Application Ser. No. 61/646,312, filed May 13, 2012, and U.S. Provisional Patent Application Ser. No. 61/771,815, filed Mar. 2, 2013, both of which are hereby incorporated herein by reference. In addition, this application is related to the following applications, all of which are also incorporated herein by reference: U.S. Ser. No. 13/893,288, entitled Full Duplex Wireless Transmission with Self-Interference Cancellation, filed May 13, 2013, U.S. Ser. No. 13/893,296, entitled Wireless Transmission with Channel State Perturbation, filed May 13, 2013, and U.S. Ser. No. 13/893,299, entitled Distributed Collaborative Signaling in Full Duplex Wireless Transceivers, filed May 13, 2013.

FIELD

The present disclosure relates to security in wireless communications. In particular, the present disclosure relates to systems and methods to use a two-way (full-duplex) link to establish a secret key, or to enhance the security.

BACKGROUND OF THE INVENTION

Full-duplex communications is used in many telecommunications technologies, e.g., ordinary wired telephones, Digital Subscriber Line (DSL), wireless with directional antennas, free space optics, and fiber optics. The impact of full-duplex links in these earlier applications is limited to doubling the rate by providing two symmetrical pipes of data flowing in opposite directions. This affects the point-to-point throughput with no direct impact on networking and security issues. In contrast, in multi-user wireless systems, due to the nature of transmission that everyone hears everyone else, security protocols are needed to access the public channels.

Although full-duplex is currently used for example in wireless systems with highly directional antennas or free space optics, the underlying full-duplex radios are essentially nothing but two independent half-duplex systems separated in space. In fact, the general two-way channel is very difficult to realize in wireless communications due to excessive amounts of self-interference, i.e., the interference each transmitter generates for the receiver(s) in the same node.

Other prior art techniques to provide a type communication system that might be referred to as full-duplex are really frequency division duplex (FDD), where separate frequency ranges are used in the transmit and receive (uplink/downlink) directions. As used herein, however, the term full-duplex is intended to refer to simultaneous transmission and reception of signals within the same frequency band.

Current wireless systems are one-way and rely on either separate time slots (Time Division Duplex) or separate frequency bands (Frequency Division Duplex) to transmit and to receive. These alternatives have their relative pros and cons, but both suffer from lack of ability to transmit and to receive simultaneously and over the entire frequency band. Even in the context of Orthogonal Frequency Division Multiple Access (OFDMA), where different frequency tones are used to simultaneously service multiple users, there is no method known to use the tones in opposite directions. A similar shortcoming exists in the context of Code Division Multiple Access (CDMA) where different codes are used to separate users. It is well known that two-way wireless is theoretically possible, but it is widely believed to be difficult to implement due to a potentially large amount of interference, called self-interference, between transmit and receive chains of the same node.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 16 and 17 are block diagram of another embodiment of a self-cancellation full-duplex transceiver.

Figure 1:
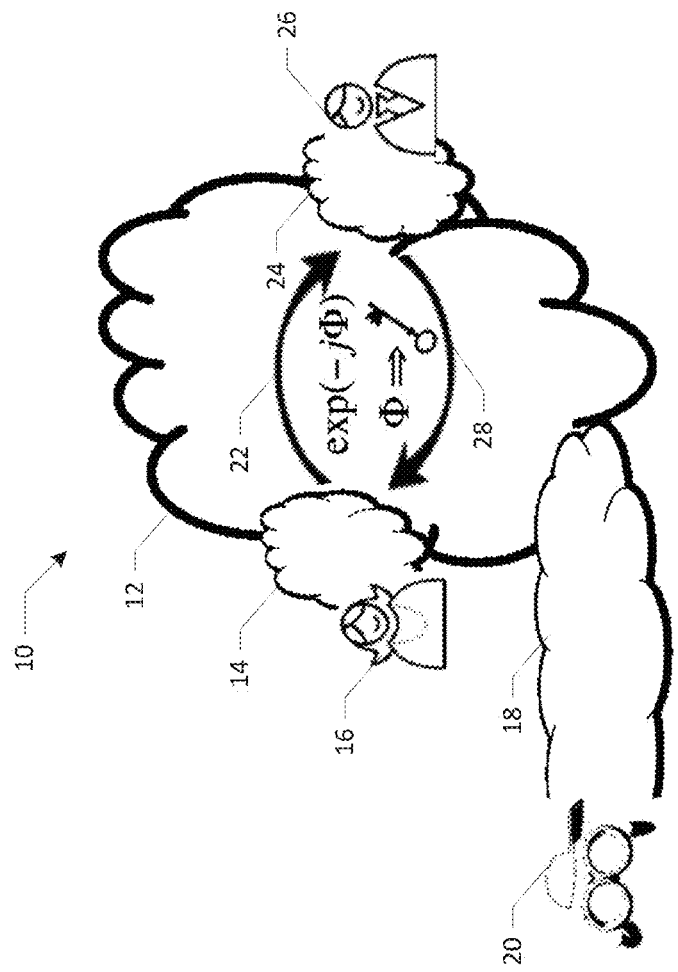
FIG. 1 is a block diagram of a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods based on using a secret key for only time, known as one-time pad, are proven to be theoretically secure. Wireless channel between two nodes A, B is reciprocal, which means it is the same from A→B and from B→A. The phase of the channel between A and B has a uniform distribution, which means it is completely unknown. A method herein uses the phase of the channel between A and B as a source of common randomness between A and B to completely mask a Phase Shift Keying (PSK) modulation. To avoid leakage of secrecy to any eavesdropper, there should be only a single transmission by each of legitimate units towards measuring the common phase value at the two ends. In addition, the radio channel changes very slowly over time, which makes it difficult to extract several of such common phase values. Embodiments described herein disclose methods based on a two-way link to overcome these bottlenecks.

Traditionally, wireless radios are considered to be inherently insecure as the signal transmitted by any given unit can be freely heard by eavesdropper(s). This issue is due to the broadcast nature of wireless transmission. In the contrary, the same broadcast nature of wireless systems can contribute to enhancing security if nodes rely on two-way links. In this case, eavesdroppers hear the combination of the two signals transmitted by the two parties involved in a connection. Described herein are methods to enhance and benefit from this feature towards improving security.

Although embodiments herein are explained in terms of using OFDM for channel equalization similar concepts are applicable to other means of signal equalization such as time domain equalization, pre-coding plus time domain equalization and time domain signaling with frequency domain equalization.

As shown in FIG. 1, the system 10 includes a user A (Alice) 16 communicating with user B (Bob 26) by way of wireless medium 12. In addition, each user (or either one) is able to alter the wireless channel characteristics using various antenna configurations, including configurable reflectors, etc, shown by 14 and 24. The users A and B each measure a round trip phase value $\Phi$ associated with the channel that is unique to their round trip transmission path 22, 28. An eavesdropper 20 may overhear the transmissions, but it will be through a different channel through medium 18.

In certain embodiments herein, security enhancements are provided. In a full-duplex communication link, modulo $2\pi$ addition of phase values occurring naturally in wireless wave propagation are used to mask several bits using Phase Shift Keying (PSK) modulation. A shared key is generated: in one symbol transmission, two nodes communicate one phase value using the channel between them. The exchange is repeated following a change in the channel for several rounds to generate several common phase values with which to define a sufficient key. Changes in the overall RF channel are achieved by perturbing RF properties of the environment close to transmit and/or receive antennas. In particular, RF mirrors may be used to change the path for the RF signal propagation. Having N such mirrors enables to extract $2^N$ phase values. This is in contrast to an N×N MIMO system, which has only $N^2$ degrees of freedom. Once enough number of common phase values are extracted, the channel is not changed any longer. The extracted phase values are used to encrypt a key with PSK modulation. Small discrepancies between the respective masks (phase values) at the transmitter and receiver are corrected through the underlying channel code. Key generation examples are provided. In one embodiment, antenna structures are connected to both transmit and receive chains (i.e. to transmit in one interval and receive in another) and in another embodiment, corrective signal injection is used to cancel self-interference and such that antenna structures need not be connected to both transmit and receive chains. Further operations may be performed to further enhance the security. This includes using the methods described herein as an enhancement to conventional methods of cryptography, or as a tool to enhance and realize information theoretical security.

A common method in security is based on bit-wise masking (modulo 2 addition) of a key (sequence of bits) with the message to be transmitted, which can be easily reversed if the two parties have access to a common key. The only provably secure system is the so-called Vernam Cipher, which is based on using such a key only once. Teachings herein observe and exploit the point that an operation similar to bit masking (binary addition modulo two, or XOR) occurs naturally in RF transmission in the sense that the received phase is the sum (modulo $2\pi$) of the transmitted phase and the channel phase. If (T,C,R) are terms in such a modulo addition, i.e., R=T+C (modulo $2\pi$), then it follows that R provides zero information about T unless C is known. Motivated by this observation, phase values can be shared between legitimate parties (as a source of common randomness) to mask phase-modulated signals. The challenge is to provide the legitimate parties with new keys while relying on the same insecure and erroneous wireless channel that exists between them.

To provide the legitimate units with such common random phase values (without the need for a public channel), methods are disclosed that utilize full-duplex links as a building block. To generate several phase values, the radio channel is intentionally perturbed after extracting a common phase value to create a fresh link towards extracting new common phase values. As legitimate units use the common phase values to mask their transmitted phase-modulated signals, then possible errors between the two keys can be compensated as part of channel coding. This is in contrast to information theoretic security that imposes strict requirements on channels, in the sense that either: 1) the channel of the eavesdropper should be inferior to the channel of the legitimate node, or 2) they require a public channel. It should be added that public channel in the language of security means a channel that is not secure in the sense that all parties can access all the data transmitted over such a channel.

Figure 2:
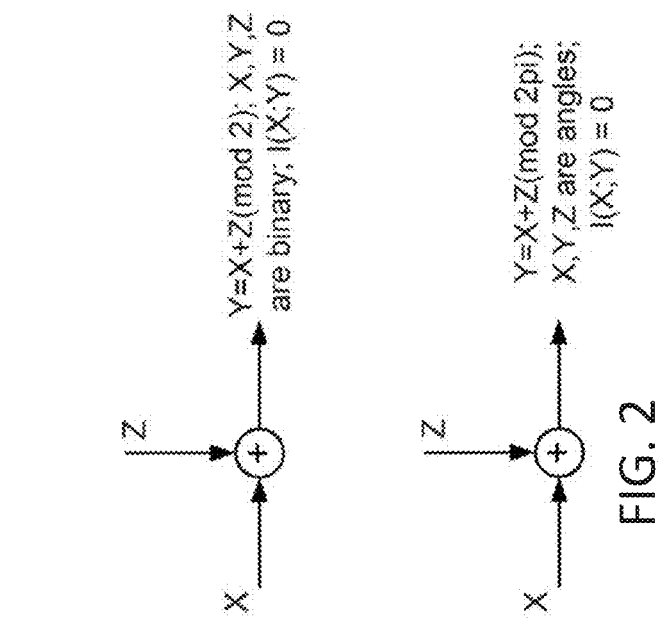
FIG. 2 depicts a phase masking operation.

With reference to FIG. 2, a conventional Vernam Cipher is based on having a mask like Z which is known at the two legitimate parties and the message X is added modulo two (XOR) to the mask Z, and this XOR operation can be reversed at the receiver end by using the same mask. In embodiments described herein: i) module 2 addition can be generalized to $2\pi$ addition of phase values, while maintaining similar independence and security properties. ii) modulo $2\pi$ addition of phase values occurs naturally as the wireless wave propagates, and consequently, it can be used to mask several bits using Phase Shift Keying (PSK) modulation. In this case, any eavesdropper will hear the PSK symbol with a different mask phase that is due to a different channel, namely the channel between transmitter and eavesdropper. Each eavesdropper antenna results in a new observation, but also introduces a new phase mask which is again uniform between zero to $2\pi$ and masks the information embedded in the transmit phase. As a result, an eavesdropper will not be able to extract any useful information, regardless of its signal-to-noise ratio and number of antennas.

An obstacle in some prior art techniques in exploiting common randomness to generate a shared key is to find a method to deal with possible errors in the shared values and consolidate the corresponding information to a smaller piece without error. In the embodiments described herein, the masks at the transmitter and at the receiver do not need to be exactly the same as small discrepancies between them can be corrected relying on the underlying channel code.

Symmetrical antenna structures and multiple stages of canceling self-interference are used to reduce the coupling between transmit and receive chain.

To further reduce the self-interference in the analog domain prior to A/D, a secondary (corrective) signal is constructed using the primary transmit signal and instantaneous measurement of the self-interference channel, which is subtracted (in analog domain) from the incoming signal prior to A/D. This can be achieved by using multiple, in particular two, transmit antennas with proper beam-forming weights such that their signals are subtracted in the air at the receive antenna. The antenna used to transmit the corrective signal can be a fully functional transmit antenna (similar to the other antenna used in the transmission) in the sense that it is connected to a power amplifier and has a low coupling with the corresponding receive antenna.

An alternative is to use an antenna which is designed exclusively for the purpose of self-interference cancellation and consequently has a high coupling to the receive antenna and can transmit with a low power. A different approach is based on subtracting such a corrective signal in the receive chain prior to A/D using methods for RF signal combing, and in particular an RF coupler, which is an operation readily performed in the transmit chain of conventional radio systems. In one aspect, the cancellation in analog domain due to the corrective signal is performed prior to Low-Noise-Amplifier (LNA). In another aspect, this is done after the LNA, and before the A/D. Cancellation of self-interference stage can be further enhanced by a subsequent digital cancellation at the receive base-band. Generalization to MIMO will be clear to those skilled in the area. Regardless of which of the above methods for active cancelation are used, the corresponding weights may be referred to as the self-cancellation beam-forming coefficients.

To further reduce the self-interference, apparatuses and methods include embodiments for cascading multiple analog cancellation stages as explained above, equipped with a disclosed training procedure.

There are also many works on using channel reciprocity as a source of common randomness in conjunction with information theoretic approaches for key generation. However, these other works are not able to exploit security advantages offered by the channel phase due to the lack of access to a stable and secure phase reference between legitimate parties. Methods described herein for full-duplex communications provide the basis to extract such a common phase reference without disclosing useful information to a potential eavesdropper.

A full-duplex link may be useful to provide security enhancement. Traditionally, wireless radios are considered to be inherently insecure as the signal transmitted by any given unit can be freely heard by eavesdropper(s). This issue is due to the broadcast nature of wireless transmission. On the contrary, the same broadcast nature of wireless systems can contribute to enhancing security if nodes utilize full-duplex links. In this case, eavesdroppers hear the combination of the two signals transmitted by the two parties involved in a connection. In the language of Information Theory, this means eavesdropper sees a multiple access channel, and consequently faces a more challenging situation in decoding and extracting useful information.

In addition, methods described herein introduce further ambiguity in time and frequency synchronization to make it harder for the eavesdropper to perform successful decoding in the underlying multiple access channel. Wireless nodes usually rely on sending a periodic preamble to initiate the link. This periodicity is exploited by a receiving end to establish time/frequency synchronization. In the case of full-duplex radios, both nodes involved in a point-to-point two-way transmission can simultaneously send such a periodic preamble, which in turn, due to the linearity of the underlying channels, results in a combined periodic signal at an eavesdropper. This makes is more difficult for an eavesdropper to form the above-mentioned multiple access channel and perform joint decoding or successive decoding. In this case, legitimate units may intentionally introduce a randomly varying offset in their frequency, which can be tracked by their intended receiver while making eavesdropping more difficult.

Methods of the key agreement protocols described herein, and devices configured to implement them, utilize the ability to change the transmission channel. This can be achieved by changing the propagation environment around transmit and/or received antennas, for example though changing the reflections of the Radio Frequency (RF) signal from near-by objects, or changing other RF characteristics of the environment with particular emphasis on varying the phase, and/or polarization. In the literature of RF beam-forming, there have been several different alternatives proposed to steer the antenna beam and some of these methods are based on changing the channel and consequently are applicable in this new context. On the other hand, unlike these earlier works reported in the context of beam-forming, there is no interest in creating a pattern for flow of RF energy (antenna pattern, or antenna beam), nor in the ability to move such a pattern in a controlled manner (beam steering).

The methods described herein create multiple (preferably) independent options for the underlying multi-path channel. This is significantly easier as compared to traditional antenna beam-forming as in a rich scattering environment, a small perturbation in the channel interacts with many reflections from the surrounding environment and thereby results in a significant change. In other words, a transmission channel in a rich scattering environment has many stable states (depending on the details of the propagation environment) and the system jumps from one such stable state to a totally different one with slightest change in the propagation environment. As an example, if there are M reflectors that could be individually turned on/off (i.e., mirror/transparent states), we could create in total $2^M$ possibilities for the channel (could be specified by an M-bit index and capable of carrying M bits of data in media-based setup). This mirror/transparent states can be realized using plasmas, inducing charge in semi-conductors, or mechanical movements, e.g., using Micro-Electro-Mechanical systems (MEMS).

Note that without a full-duplex link, it would not be possible to use the phase as a source of providing security. In particular, when the transmitter and the receiver are far from each other, it would be very difficult to use the same wireless channel that is between them to agree on a common phase value without disclosing relevant information to eavesdropper. The reason is that measured phase depends on the time of transmit/receive, and even imperfections like frequency offset can cause large variations in phase. In other words, in ordinary point-to-point communication based on one-way transmission, phase is defined relative to some preamble, which is extracted locally at each unit. Full-duplex makes it possible to establish a global reference of phase between legitimate units.

There are some prior works aiming to use channel reciprocity to create keys for security. These earlier works differ in the following ways: 1) They rely on channel magnitude which has a probability distribution that makes it relatively easy to guess. 2) They do not rely on masking through phase addition in the channel. 3) They do not change the channel from transmission to transmission to enable generating new keys. Indeed, to produce larger keys in these earlier setups, it has been argued that the use of multiple antennas and beam-forming would be a viable option, but having a K×K antenna system results in only $K^2$ independent values, regardless of how the beam-forming is performed, which is usually not adequate to generate a key of a reasonable size.

Techniques herein account for any remaining self-interference when it comes to using the channel complex gain values to generate key. This is equivalent to a linear system with feedback, and as long as there are adjustments to gain values, the system will remain stable. The leakage channel may even work to an advantage and add another level of ambiguity for the eavesdropper.

In summary, in one symbol transmission, the two legitimate parties (Alice and Bob) communicate one phase value using the wireless channel that is between them (no public channel required), and then they will locally change the channel. It is relatively easy to change the channel phase, because small perturbations in the rich scattering environment will result in a new phase value of received RF signal for all parties, including for the eavesdropper. This process continues until Alice and Bob have enough number of such keys, and subsequently the channels are not changed any longer, and the extracted phase values are used to encrypt the message with PSK modulation. In case there are errors between these two keys, the channel code on top of the message symbols will correct it.

Figure 3:
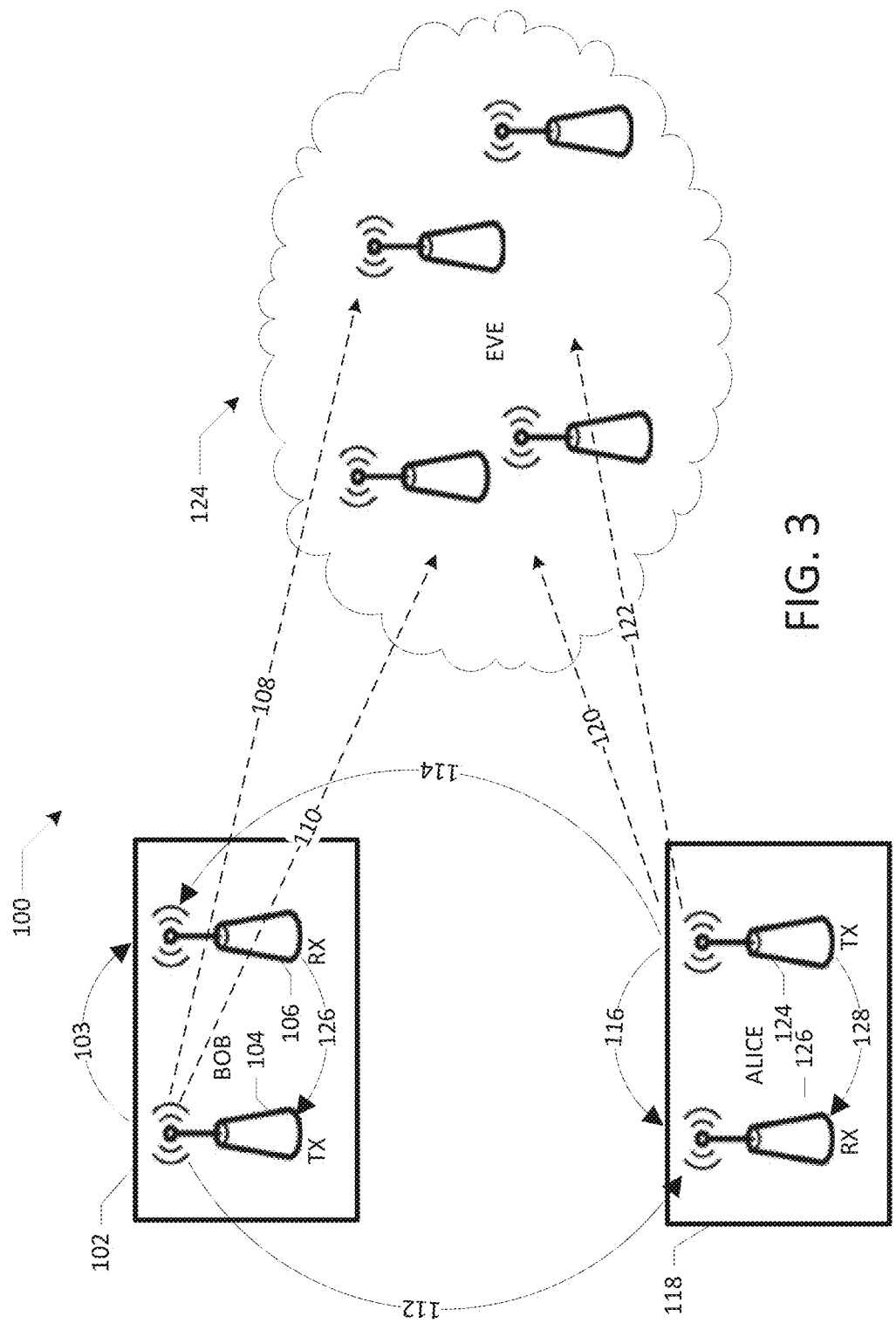
FIG. 3 is a channel diagram of full-duplex transceivers in accordance with some embodiments.

In one embodiment of this invention illustrated in FIG. 3, Alice 118 and Bob 102 each have two antennas (126, 124, and 104, 106, respectively) with very low coupling between the two antennas, using the methods described herein based on cascading multiple stages of analog cancellation. Prior to exchanging a phase value to be used as a key, Alice and Bob, the first the two legitimate parties, measure the filter coefficient to be used in multi-stage analog cancellation. This measurement is performed by sending a low power pilot such that any eavesdropper does not hear it.

Then, one of the two legitimate parties acts master and the other one as slave. For example, if Alice is the master, her full-duplex transceiver 118 generates a sinusoidal signal of a know frequency and transmits it via channel 114 to Bob. Bob, the slave, forwards it from his receiver to his transmitter as shown by path 126, and amplifies it and forwards the received back to Alice via transmission channel 112. Each unit operates in full-duplex mode to cancel their respective self-interference signals (116, 103) caused by the transmissions.

Both units may use continuous filtering in time to mitigate the delay problem associated with looping back the received signal back to the originating master. Note that the initial channel measurements can be still performed in OFDM domain, with filter structure translated into time domain implementations.

The roles are then reversed, and Bob initiates a transmission 112, and Alice loops it back to Bob via transmission channel 114. Then, each unit accounts for its internal phase shift associated with its internal processing 126, 128 by accounting for its value and use the resulting phase as a PSK mask. That, while providing the loopback signal, each node may determine its own internal delay, or may even impose a pseudo random delay that is not known to the distant end master. When the units receive the masked signal from the distant end, they may first remove that pseudo random value, leaving only the common channel phase, which will be the same for each end. In this way, both transceivers 102, 118 are able to measure and obtain the same total channel round trip phase value.

Then, either one of the transceivers, or both of them, may then alter their transmit antenna characteristics and initiate another phase measurement, taking turns as master and slave to mutually measure a round trip phase value. Upon obtaining enough such phase values, one of the units may be configured to convey data using the sequence of shared-secret round-trip phase values. In one embodiment, the system may be configured to generate a random key such as a random binary sequence, apply FEC to the key value, and then PSK modulate the coded bits. The resulting PSK symbols may then be masked with the sequence of phase values (accounting for its internal phase shift) and transmits them to the other party. The recipient accounts for its internal phase shift (by subtracting it), then removes the mask by subtracting its estimate of the sequence of phase values, and finally demodulates the PSK symbols and decodes the FEC.

Now assume eavesdropper Eve has a large number of antennas, each with a very high signal to noise ratio. Each of eavesdropper's antennas will hear two signals, but these signals are received through a channel of an unknown phase. Due to the fact that when phase values are added module $2\pi$, the result conveys zero information about each of them, eavesdropper will not be able to extract any useful information about the phase value exchanged between Alice and Bob. Note that in FIG. 3, the interference signals are generally referred to as 108, 110, 120, 122, but in reality, each transmit 104, 124 has a unique channel to each of the eavesdroppers 124 antennas.

Figure 4:
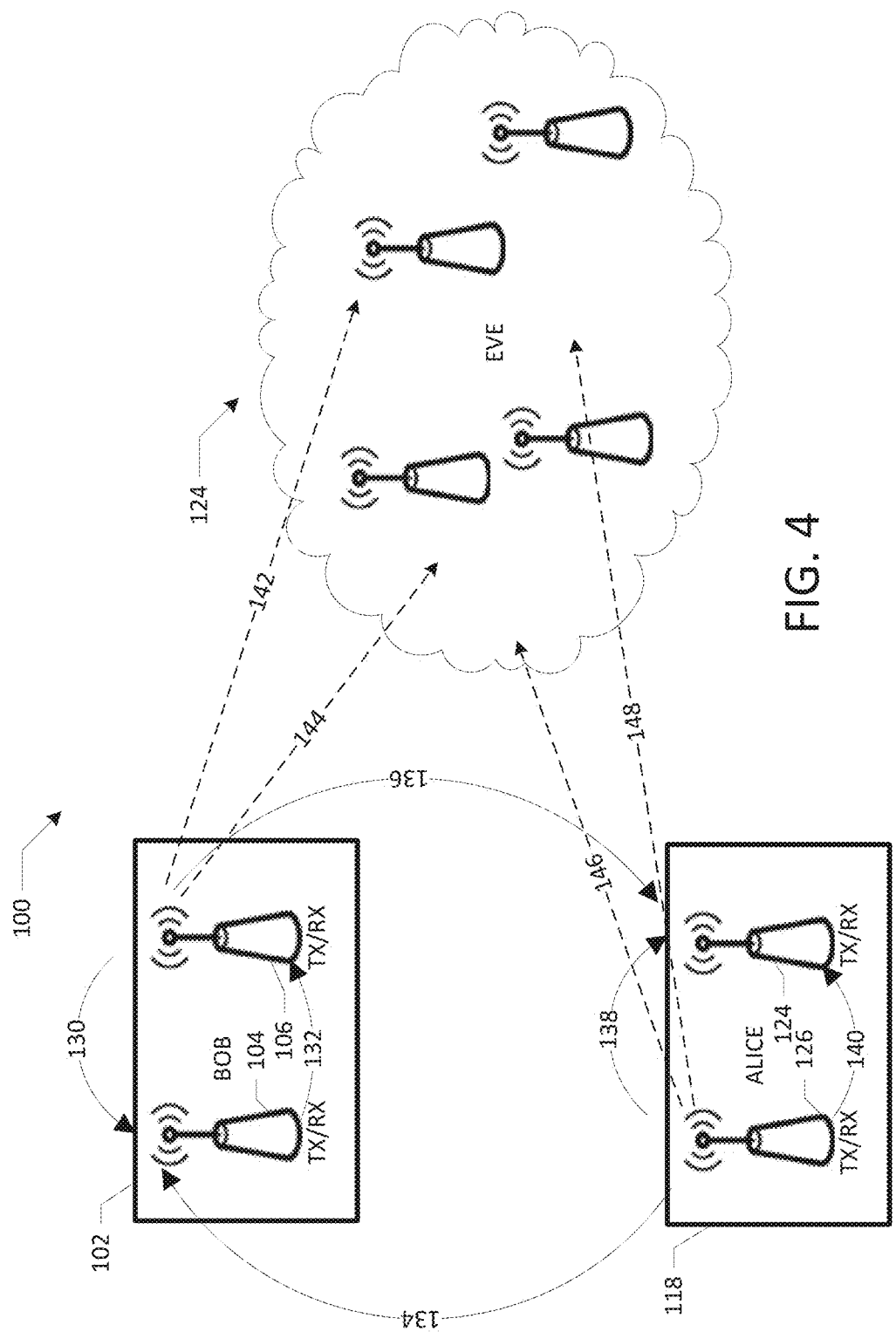
FIG. 4 is a channel diagram of full-duplex transceivers in accordance with some alternative embodiments.

In a second setup illustrated in FIG. 4, the initial transmission by the master occurs in the same manner as described with respect to FIG. 3, and is not depicted in FIG. 4. Rather, FIG. 4 shows an alternative message transmission and loopback associated with the second measurement of the common phase once the role of master and slave is reversed, where Bob initiates the transmission. In particular, each transceiver reversed the roles of its antennas, and instead of transmitting with antenna 104, transceiver 102 initiates its transmission with antenna 106, which is the antenna that it had previously used to receive the signals from Alice during the prior first phase measurement. Similarly, Alice receives the signal on antenna 124 and retransmits the loopback signal using antenna 126.

In the process of exchanging a phase value to be used as a key in this embodiment, Alice and Bob collectively have four antennas and have thus used each of them only once for a single transmission. Now assume eavesdropper Eve has a large number of antennas, each with a very high signal to noise ratio. Each of eavesdropper's antennas will hear four signals, but these signals are received through a channel of an unknown phase. Due to the fact that when phase values are added module $2\pi$, the result conveys zero information about each of them, eavesdropper will not be able to extract any useful information about the phase value exchanged between Alice and Bob.

In the embodiment of FIG. 4, antenna structures are connected to both transmit and receive chains (transmit in one interval and receive in another one). This feature enables a reliance on the reciprocity of the channel, and thereby reduces the total number of transmissions between Alice and Bob such that an eavesdropper is not able to gather enough equations to solve for the unknowns. Consequently, eavesdropper 124 cannot obtain useful information about the exchanged phase value. The disadvantage of this setup is that each antenna should be connected to both transmit and receive chains, but in return, it is robust with respect to any remaining amount of self-interference.

Figure 5:
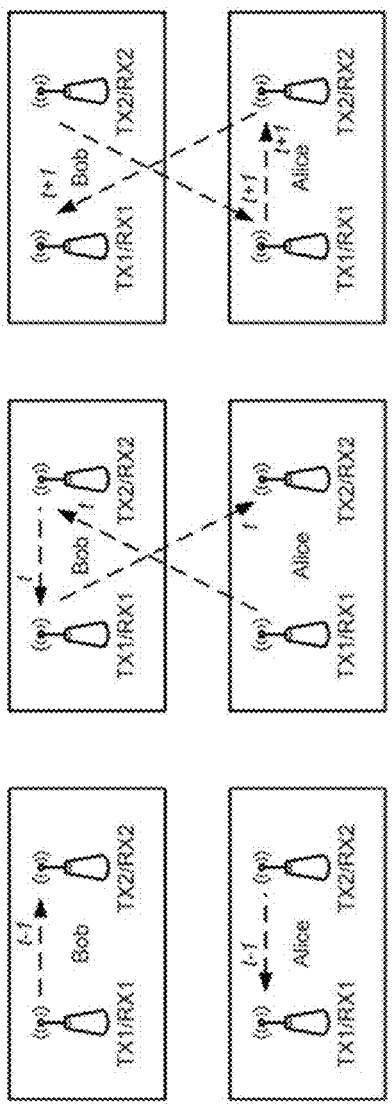
FIG. 5 shows schematic views of a first method for key exchange using channel reciprocity and thereby providing symmetry in the end-to-end 4-port network.

With reference to FIG. 5, at OFDM symbol t−1, Alice and Bob measure their loop-back interference channels from Bob/TX1 to Bob/RX2 and from Alice/TX2 to Alice/RX1 (send low power pilots after scrambling and loop back in each unit). At OFDM symbol t, Alice/TX1 sends pilots (after scrambling) to Bob/RX2, who (using Bob/TX1) forwards it to Alice/RX2. At OFDM symbol t+1, Bob/TX2 sends pilots (after scrambling) to Alice/RX1, who (using Alice/TX2) forwards it to Bob/RX1. The two units, knowing their loop-back channels and relying on reciprocity, compute the channel: (Alice/TX1→Bob/RX2)×(Bob-loop-back)×(Bob/TX1→Alice/RX2)×(Alice-loop-back) to be used a key. Note that multiplication is used, but it is understood that multiplication of the channel measurement values results in addition of the phase angles. This is possible as up/down conversion at each unit is performed using the same carrier/clock.

Figure 6:
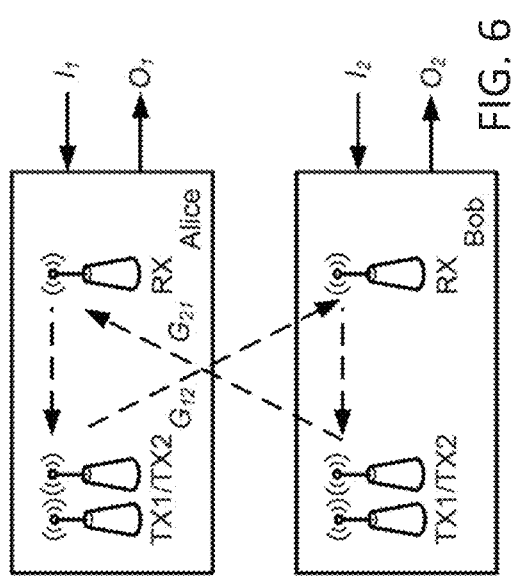
FIG. 6 shows a second method for key exchange, wherein eavesdropper in total listens to four transmissions, but also adds four unknowns (e.g. channel phase to their receive antenna(s)) and consequently cannot extract any useful information from such measurements.
Figure 8:
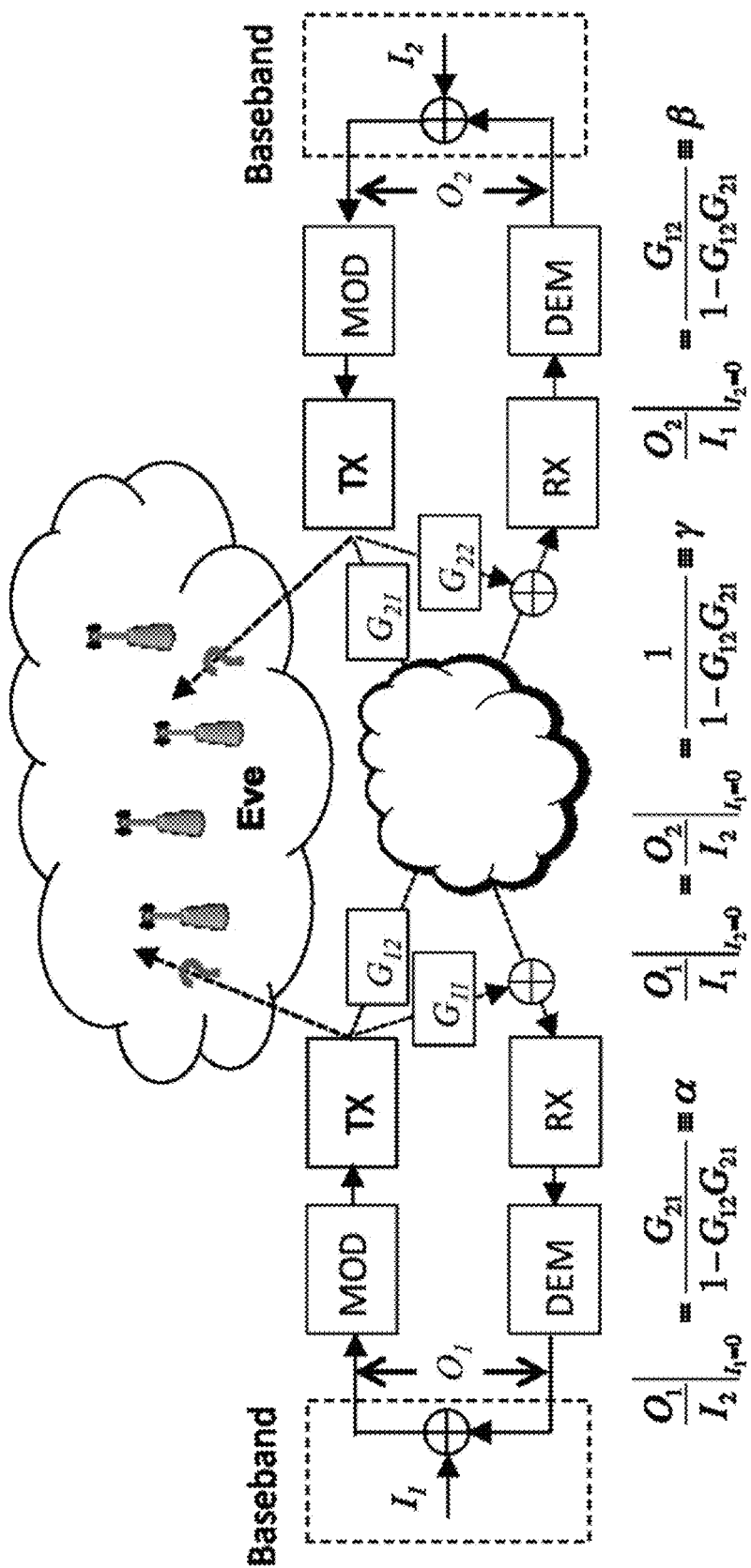

FIG. 6 shows that in the second method for key exchange, eavesdropper in total listens to four transmissions, but also adds four unknowns (e.g. channel phase to their receive antenna(s)) and consequently cannot extract any useful information from such measurements.

Figure 7:
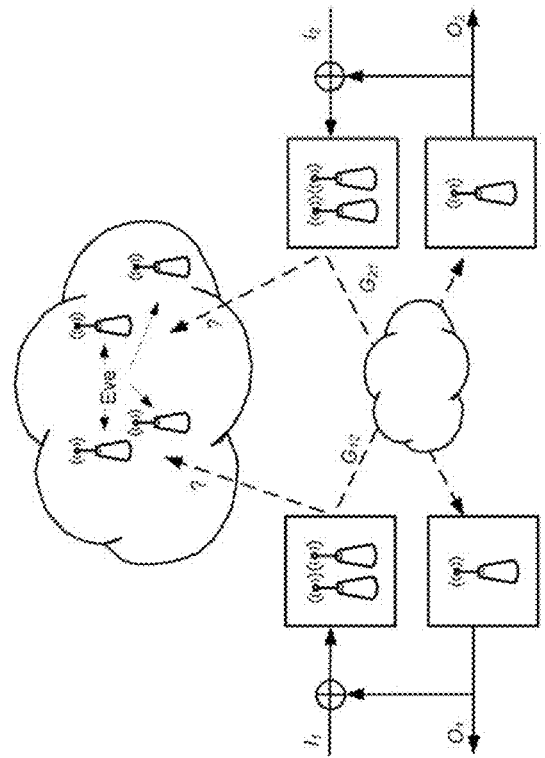
FIGS. 7 and 8 show schematic views of a third method for key exchange based on cancelling self-interference and thereby providing symmetry in the end-to-end 4-port network.

In a further embodiment illustrated in FIG. 7, legitimate units locally impose stricter requirements on the level of self-interference cancellation at their respective units. For example, this can be achieved if each node locally examines multiple channel perturbations and select those one that result in the lowest amounts of self-interference. This in return enables a relaxation of the requirement of each antenna being connected to both transmit and receive chains. In this embodiment, the input and output signals ($I_1$, $O_1$, $I_2$, $O_2$) of Alice and Bob in base-band form a four-dimensional vector that spans a two-dimensional sub-space (two equations are dictated by the overall structure). For linear systems:

$$\left.\frac{O_1}{I_2}\right|_{I_1=0} = \frac{G_{21}}{1-G_{12}G_{21}} \equiv \alpha$$

$$\left.\frac{O_2}{I_1}\right|_{I_2=0} = \frac{G_{12}}{1-G_{12}G_{21}} \equiv \beta$$

-continued $$\left.\frac{O_1}{I_1}\right|_{I_2=0} = \left.\frac{O_2}{I_2}\right|_{I_1=0} = \frac{1}{1-G_{12}G_{21}} \equiv \gamma$$

$$O_1 = \gamma I_1 + \alpha I_2$$

$$O_2 = \beta I_1 + \gamma I_2$$

Note that, due to the cancellation of self-interference, the gain from $I_1$ to $O_1$ is the same as the gain from $I_2$ to $O_2$. This feature, which acts as a counterpart to the channel reciprocity in the earlier embodiments, enables agreement on a key using only two transmissions, instead of four. In both of these embodiments each transmit antenna is used only once.

In a further embodiment, two pilots are transmitted simultaneously, which can be considered as unit vectors, from Alice and Bob. Then, in the next transmission, one of them, say Bob, sends the negative of the same pilot. These two steps provide enough equations to Alice and Bob to compute two common phase values corresponding to the transmitted pilots times their corresponding channel gains. For better security, only one of these (or a function of the two) is used as the key. After this exchange of common phase value, the environment (channels) at the neighborhood of both Alice's and Bob's transmit antenna(s) are perturbed, possibly with local selection among multiple perturbations to reduce the amount of self-interference. Then, Bob and Alice send low power and scrambled pilots to measure their self-interference channels to be used towards cancellation of self-interference and the process continues to obtain another common phase value.

Full-duplex links also provide a means to enhance information theoretical security. It should be added that information-theoretical security has its own challenges in term of implementation, but it has been the subject extensive research in the recent years, and if it is not a replacement for traditional security, it can be an addition to it. Note that feedback does not increase the capacity of an ordinary memory-less channel, but it does increase its secure capacity, because eavesdropper would be listening to a multiple access channel, and therefore, it is possible to enhance the secure capacity.

Inherently, eavesdropper Eve receives the sum of Alice's and Bob's signals which would make eavesdropping more difficult. Depending on where in the capacity region of the underlying multiple access channel it is desired to operate, there will be different options. One extreme option of maximizing the rate form Alice to Bob is that Bob transmits a secret key to be used by Alice, as a complete key or as a partial key, in its next block transmission.

To further enhance the security, an embodiment of this invention relies on the following. In practical OFDM systems, there is always the need for using a periodic preamble for the purpose of frequency synchronization between transmitter and receiver. This frequency synchronization is important because the slightest mismatch in frequency will make it significantly more difficult for the receiver to detect the signal. To exploit this feature towards enhancing security, after the initial stages that the connection has been established, Alice starts sending a periodic sequence to Bob, and Bob also sends a similar periodic sequence with high power. An eavesdropper will receive the sum of these periodic sequences passed through their respective channels and the received signal remains periodic. In each transmission, say each OFDM symbol, Alice introduces a random frequency offset in its carrier. As Bob has transmitted the periodic sequence with high power, it will be difficult for eavesdropper to detect the random offset that is introduced in Alice's carrier frequency. However, Bob will have no problem in detecting that, and Alice knows its frequency offset with Bob. So, Alice and Bob will be able to create some additional confusion for eavesdropper without disrupting the legitimate link. Following this phase, when it comes to the transmission of the actual OFDM symbol, it can contain a secret key to be used in the next transmission.

As described above, the ability to change the channel from symbol to symbol is used in the key generation protocols. This is achieved by changing the RF environment around transmit antenna(s). In general, beam-forming using tunable RF, usually based on changing the dielectric or conductivity property by applying voltage, is an active area of research. Note that for the specific scenarios of interest, the channel may be changed from one random state to another random state. This means, unlike the case of beam-forming, it is not necessary to know what the current state is and what the next state will be, there is no intension to control the details of the channel state either, and any variation in channel phase will be sufficient to satisfy the needs. In traditional beam-forming applications, the intension is usually to focus the energy in a directional beam, and preferably to be able to steer the energy beam. Due to natural inertia that exists, it is usually more difficult to modify the energy density, rather than just changing the phase. Particularly, in the case of rich scattering environments, it is relatively easy to change the channel phase, to move from one stable point to a totally different point with independent values.

Hereafter, an RF-mirror is defined as an object, which would pass, reflect, partially pass/partially reflect an RF signal. An RF-mirror can have static parts with fixed RF properties, as well as dynamic parts with RF proprieties that are dynamically adjusted through digital (on-off) or analog control signals. Such a constriction will be called a tunable RF-mirror hereafter. RF-mirrors and tunable RF-mirrors will be useful components in inducing channel variations.

Figure 9:
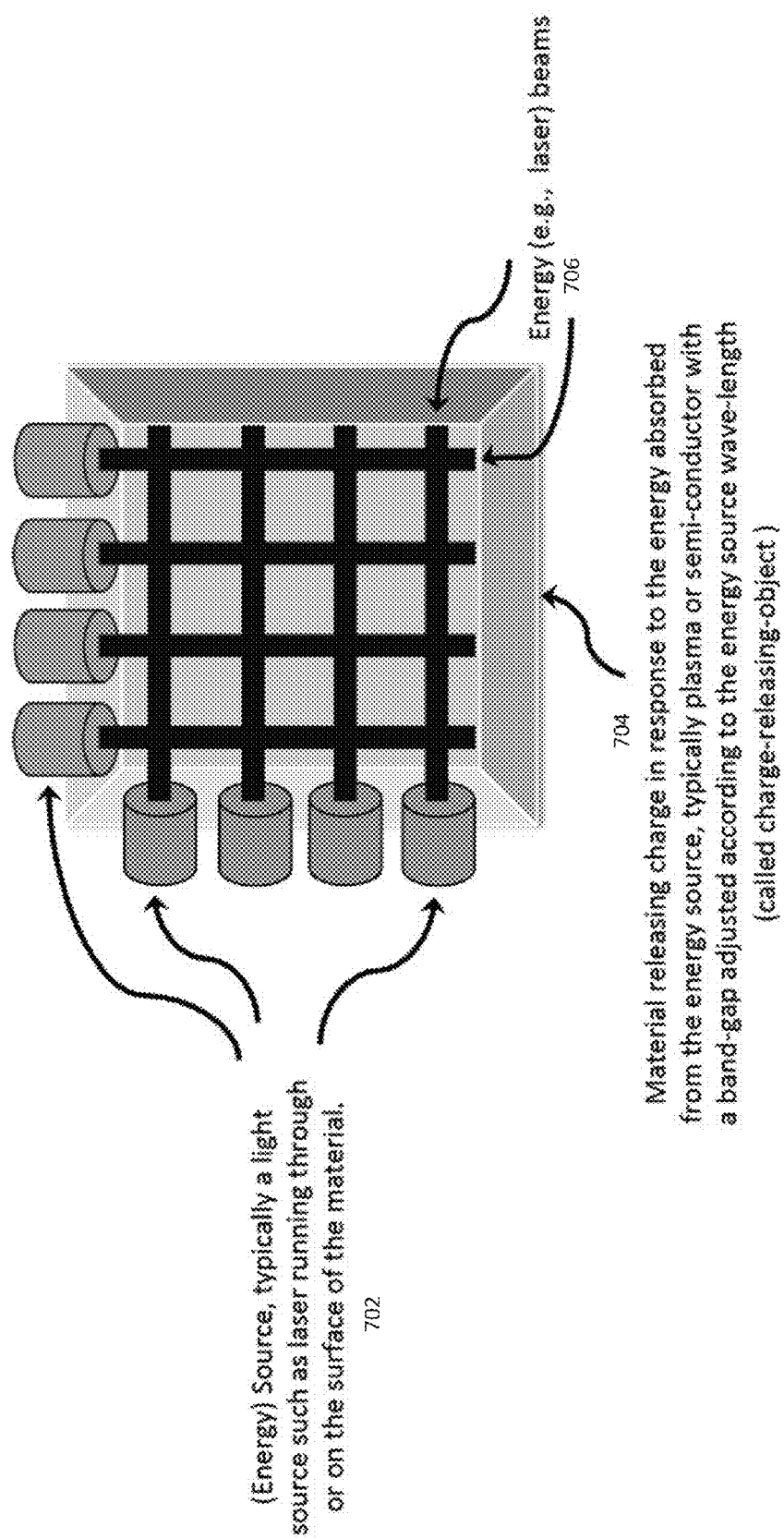
FIG. 9 shows a pictorial view for a first example of an RF-mirror used to reflect RF signals, in part, with methods for adjusting the level of reflection, i.e., tunable RF-mirror.

FIG. 9 shows an example for the realization of an RF-mirror disclosed in this invention. Material releasing electrons or holes, referred to as a charge-releasing-object hereafter, releases charge, typically electrons, in response to the energy absorbed from a source of energy, typically a laser, which in turn reacts to the control signals. An example of charge-releasing-object to be used with a light source is a semi-conductor, e.g., structures used in solar cells, Gallium Arsenide, materials used as photo-detectors in imaging applications such as a Charge-Coupled-Device (CCD), materials used to detect light in free space optics, materials used to detect light in fiber, or high resistivity silicon, typically with a band-gap adjusted according to the light wave-length. Another example is plasmas with their relevant excitation signaling as the energy source. For the example in FIG. 9, the intensity of light, which is typically controlled by the level of input current to the laser and number of lasers that are turned on, contributes to the amount of light energy converted into free electrons and consequently affects the conductivity of the surface. This feature can be used to convert the corresponding RF-mirror to a tunable RF-mirror. We can also place a mirror to reflect light, called a light-mirror hereafter, on top to increase contact of the light with the surface of the charge-releasing-object underneath, and even adjust such a light-mirror towards tuning of the overall RF-mirror.

Figure 10:
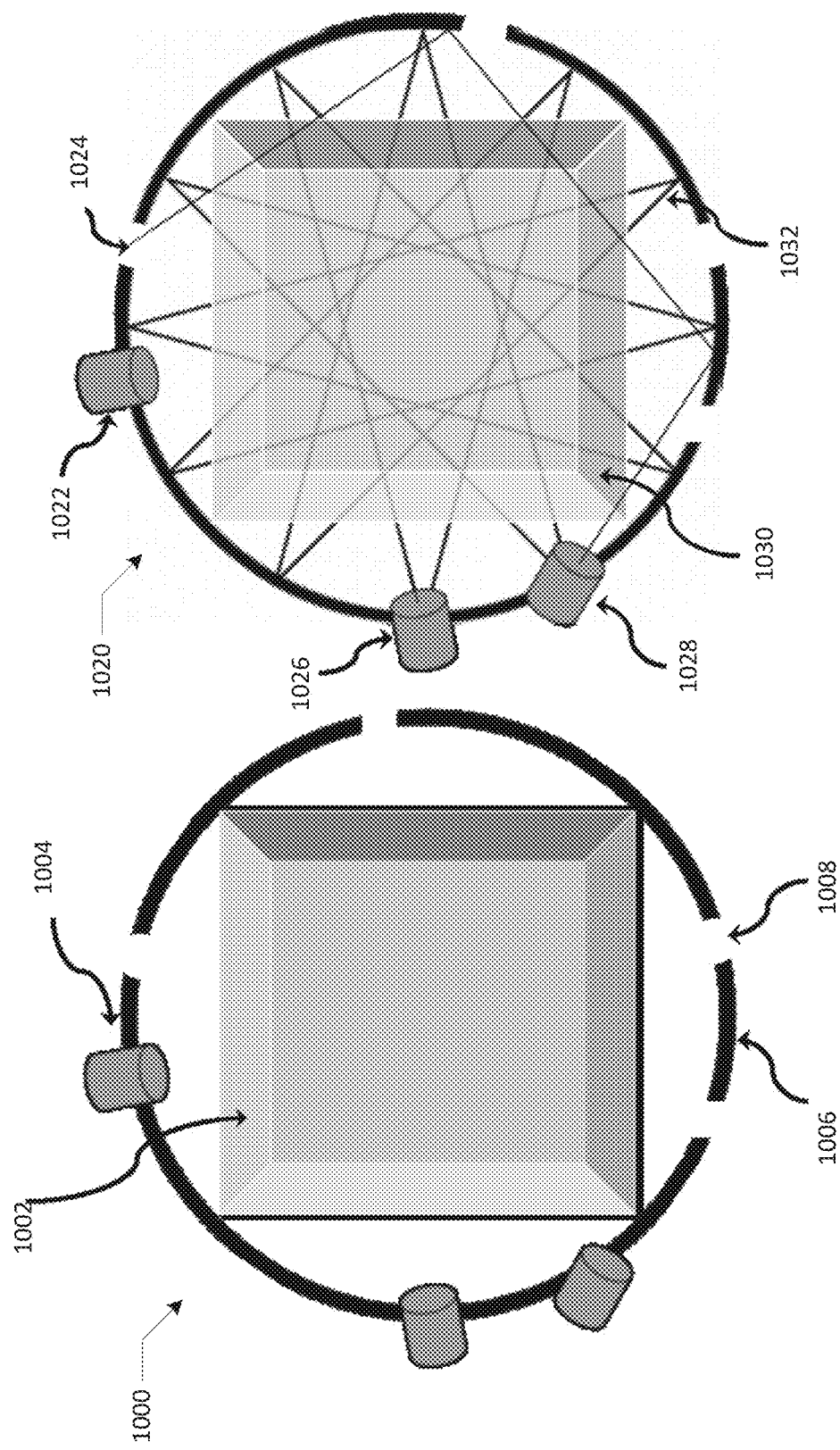
FIG. 10 shows pictorial views for a second example of a tunable RF-mirror.

FIG. 10 shows a second example 1000 where a light-mirror 1006 is placed around the charge-releasing-object. The objective for this light-mirror is to confine the light to increase the amount of energy absorbed by the charge-releasing-object. In addition, through adjusting the angle of different light sources, it is possible to control the number of reflections for any given source and thereby the amount of energy from that source releasing charges. This feature can be further enhanced by creating cuts in the light-mirror to stop reflections for any given light source at a point of interest. These cuts can be controllable as well (pieces of on-off light-mirrors) to enhance the controllability of the amount of released charges and thereby the behavior of the RF-mirror in response to the RF signal. 1002 shows material with a band-gap adjusted according to the light wavelength (called a charge releasing object). Light source 1004, such as a laser runs through or on the surface of the material. The circular, or polygon, region 1006 with material reflecting light except for the places shown as cuts 1008 (referred to as a light mirror).

The device 1020 of FIG. 10 shows a closer look at the example for the light-mirror around the charge-releasing-object 1030. Note that the light from each laser 1022, 1026, and 1028, depending on its angle, can go through many reflections at distinct points, covering several turns around the loop, until it hits the mirror at one point for the second time. This completes one cycle of reflection as shown by path 1032. After this second incidence, the same path will be covered again and again with subsequent cycle overlapping in space. By adjusting the starting angle of the beam light, the number of such reflections in a cycle can be adjusted which in turn affects the area of the charge-releasing-object that is exposed to light. This feature can be used to have a tunable RF-mirror (depending on the combination of light sources that are turned on), even if all sources have a constant power. Additionally, it is possible to adjust the level of input current driving the laser(s) for tuning purposes. Note that path 1024 is such that the angle of the laser and positions of the cuts are such that the beam from source 1028 ends by exiting through the cut prior to completing a cycle.

Figure 11:
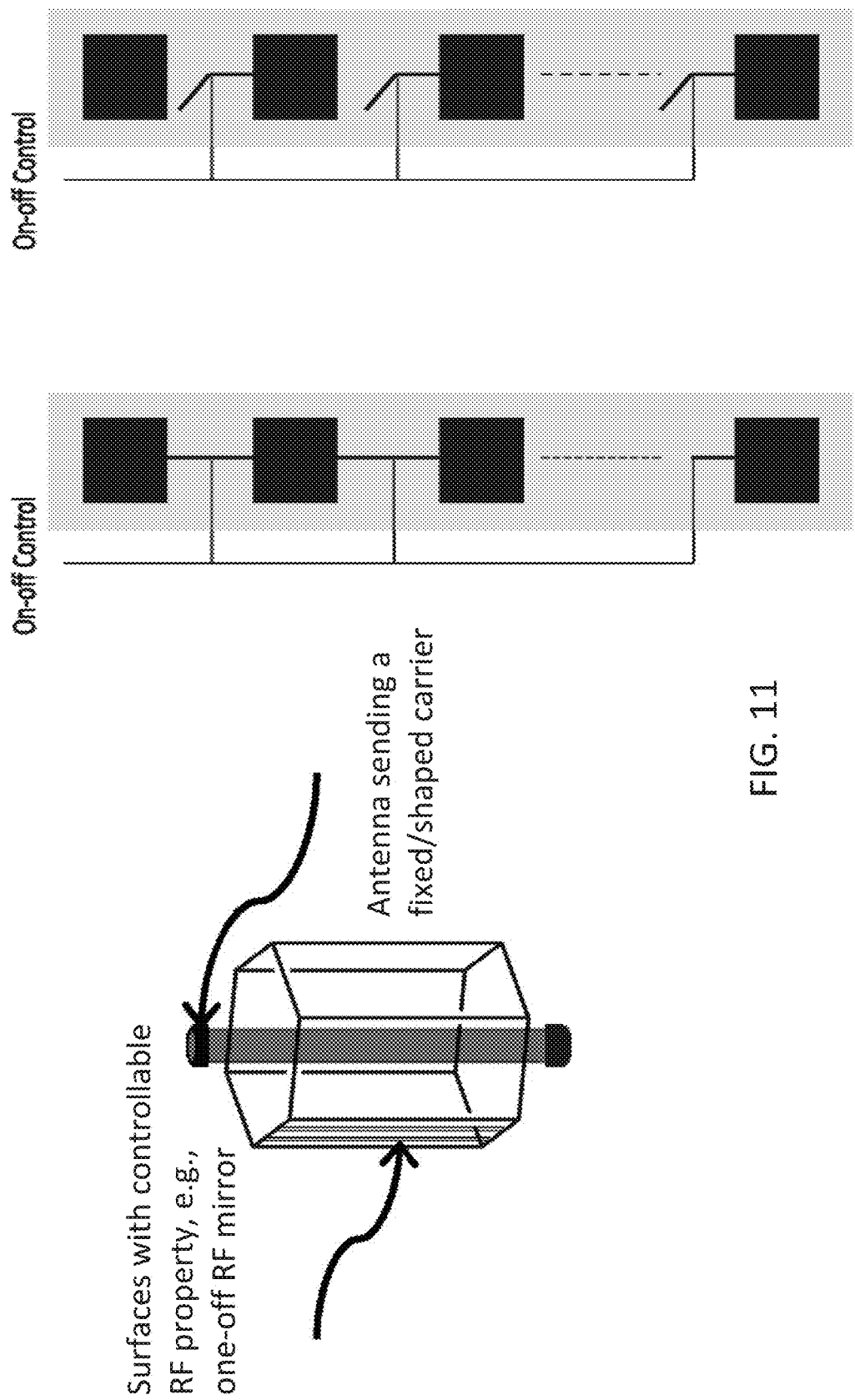
FIG. 11 shows pictorial view for a third example of an on-off RF-mirror.
Figure 12:
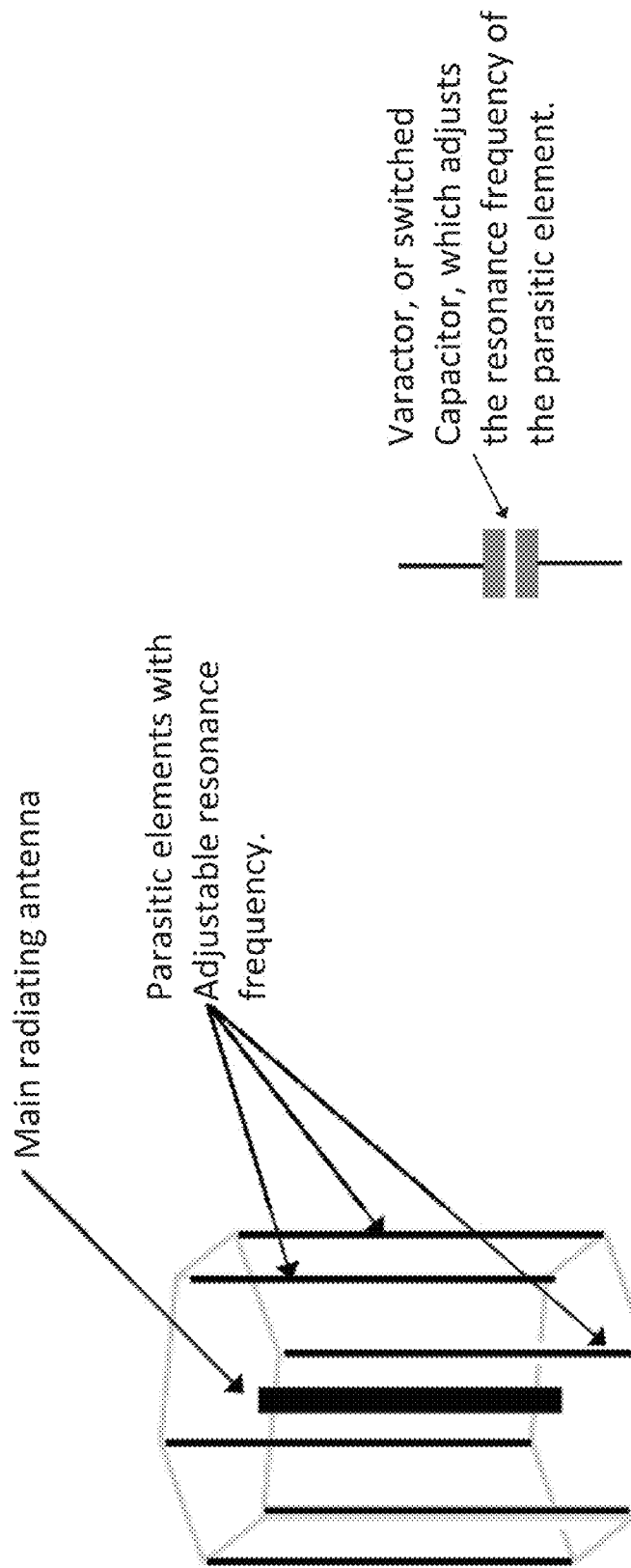
FIG. 12 shows a pictorial view for two examples of tunable RF chamber surrounding transmits and/or receive antenna.

FIG. 11 shows a different approach to create an RF mirror. The switches on any one surface will be either all closed, or all open, which results in an on-off RF mirror. FIG. 12 illustrates methods to surround a transmit or receive antenna with objects capable of RF perturbation, e.g., on-off RF mirror, including methods to enhance the inducted channel variations.

Next, some additional methods of using "induced channel variations" are explained.

Methods explained herein use the induced channel variations to increase a number of extracted common phase values. Once this capability is present, it can serve some other objectives as well, e.g., reducing transmit energy for a given transmit rate and coverage, or a combination of these two objectives. Examples include increasing diversity to combat fading; increasing error correction capability to combat multi-user interference or other factors degrading transmission; and avoiding poor channels in terms channel impulse response. Obviously, saving in transmit energy translates into larger coverage and/or less multiuser interference. In the context of selecting a channel with a good impulse response, the objective, for example, can be to improve Signal-to-Interference-Ratio (SINR) including the effect of multi-user interference, enhance diversity in OFDM domain, or improve link security in key exchange. Methods herein may use the observation that the channel impulse response affects the structure of the receiver match filter, and thereby affects the level of multi-user interference at the base-band of the desired receiver. If the purpose is enhancing diversity, channel can be varied between OFDM symbols (kept the same during each OFDM symbol). This induces channel variations over subsequent OFDM symbols, which can be exploited to increase diversity, e.g., by coding and/or modulation over several such OFDM symbols. In this setup, receiver needs to learn the OFDM channel for each OFDM symbol. This can be achieved through inserting pilots in each OFDM symbol and/or through inserting training symbols. In the latter case several OFDM symbols can be grouped together to reduce training overhead, i.e., each group of OFDM symbols relies on the same training and channel is varied between such groups. Furthermore, pilots can be inserted among OFDM tones to facilitate training, fine-tuning and tracking.

Another method to exploit induced channel variation is to use the feedback link, e.g., the one present in two-way links, to select the channel configuration with a preferred impulse response towards increasing received signal energy as well as reducing interference. It should be noted that the details of the impulse response affects the receiver structure, which normally relies on a matched receiver. As a result, the impulse response from a node T to a node R affects both the gain from T to R as well as the amount of interference at R from an interfering transmitter, say T'. Conventional methods usually rely on multiple antennas and antenna selection to improve received signal strength and reduce received multi-user interference. However, in these conventional methods antenna selection at the transmitter T only affects the forward gain from T to R and does not have any impact on the interference from T' on R. To affect both signal and interference, conventional methods require antenna selection to be performed at R and this results in some limitations. These conventional methods need a separate antenna to provide additional independent gain values over the links connected (starting from or ending to) to that antenna. Methods of this invention realize similar advantages while avoiding some of the disadvantages associated with these earlier approaches. One advantage is that it is fairly easy to induce channel variations resulting in different impulse responses. For example, by relying on Q on-off RF-mirrors, methods of this invention can create $2^Q$ different impulse responses. This feature makes it possible to increase the number of candidates available for the selection at an affordable cost. Methods of this invention also benefit from the observation that changing the channel impulse response by inducing variations around transmitter T in communicating to R also affects the interference received at R from an interfering transmitter node T' (selection is based on considering both signal and interference). In contrast, in traditional methods using multiple antennas, selecting a different antenna at the transmitter side T does not affect the level of interference from T' on R. In the case of using OFDM, methods of this invention based on channel impulse selection and matched filtering (to improve signal and reduce interference) are still applicable as these involve processing in time prior to taking the received signal to frequency domain. In the case of OFDM, an additional criterion for channel impulse selection can be based on the level of frequency selectivity in the resulting OFDM channel to increase diversity in the frequency domain.

Methods described herein in the context of using induced channel variations were explained in terms of changing propagation properties around transmit antenna(s). However, similar techniques can be applied if the channel is changed around the receive antenna(s), or a combination of the two, i.e., RF properties of environments around both transmit and receive units are perturbed to enhance the induced channel variations.

Figure 19:
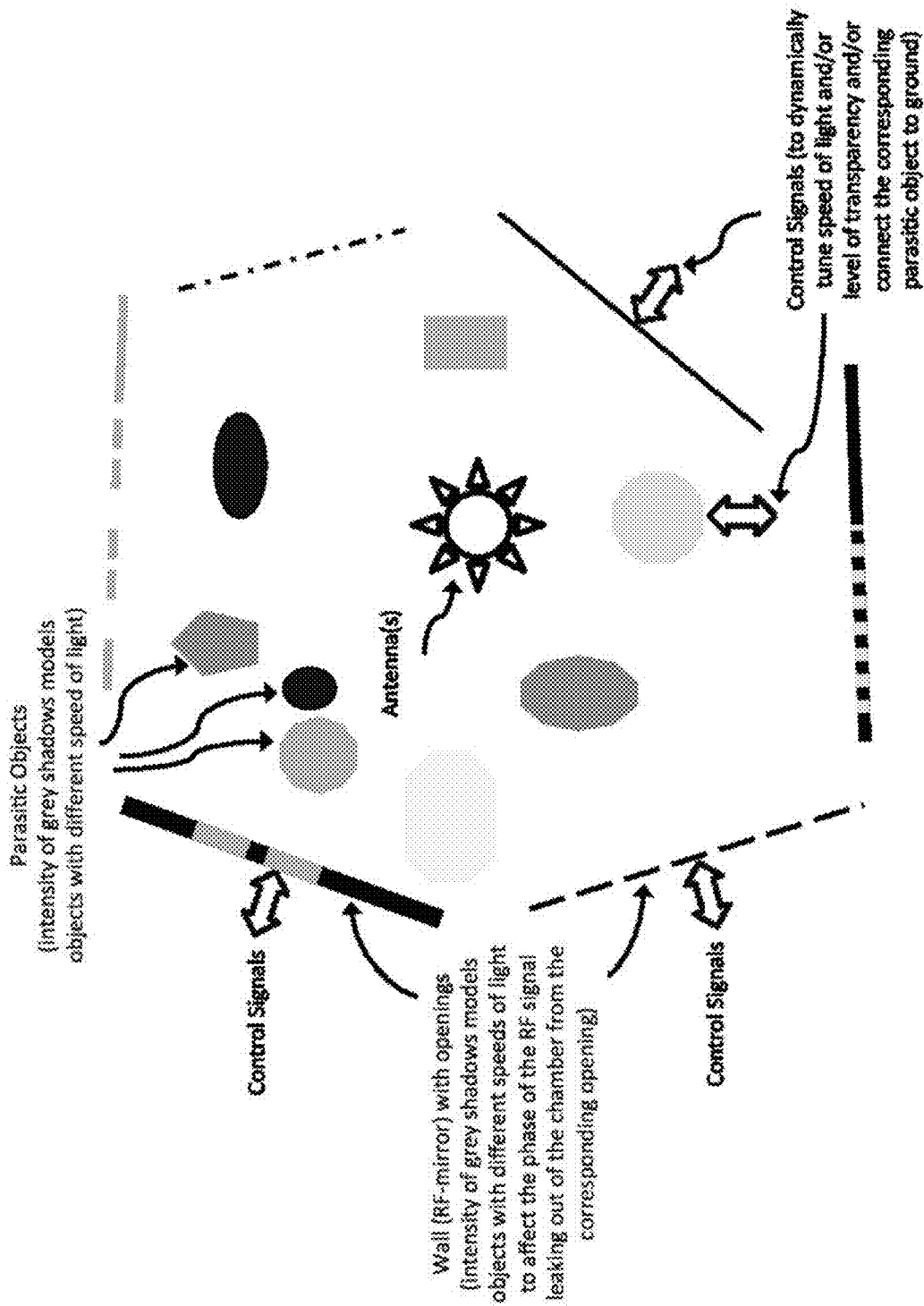
FIG. 19 depicts an environmental model of objects that affect the phase of RF signals.

Inducing channel variations in areas close to transmit and/or receive antenna(s), in particular in the near field, can have a particularly strong influence on the channel impulse response. To enhance this feature, and in some sense realize rich scattering environments, this invention also includes methods in which static objects (called parasitic elements hereafter) that can affect the propagation properties, e.g., pieces of metal to reflect RF signal, are placed in the vicinity of the transmit and/or receive antenna(s) to enhance the induced channel variations. In this regard, FIG. 19 depicts parasitic objects where the intensity of grey shadows models objects with different speed of light. For example, a wall (RF-mirror) with openings, where the intensity of grey shadows models objects with different speeds of light to affect the phase of the RF signal leaking out of the chamber from the corresponding opening. FIG. 19 also depicts antenna(s) and control signals to dynamically tune speed of light and/or level of transparency and/or connect the corresponding parasitic object to ground.

In addition to features of the channel impulse response that affect the energies of the received signal and/or interference terms, the length of the impulse response also plays a role in separating signals and exploiting advantages offered by the induced channel variations. Placement of parasitic elements affects the length of the channel impulse response. In particular, to enhance frequency selectivity, a longer channel impulse response is needed. To realize this, methods of this invention include placing parasitic elements in the form of reflectors; transparent, or semi-transparent delay elements, forming walls around transmit and/or receive antenna(s). This construction will be called a chamber, hereafter. FIG. 10 shows a pictorial view (viewed from top) for an example of such a chamber. Walls of the chamber can be, for example, construed using constructions disclosed in FIGS. 9 and 10. The size of walls and placement of openings for the chamber can be static or dynamically tuned to adjust the channel impulse response. Openings may include air and/or delay elements formed from materials with proper (preferably tunable) conductivity, proper (preferably tunable) permittivity, or proper (preferably tunable) permeability. Example for tunable conductivity include: 1) Injecting electron into a semi-conductor, e.g., using a metal-semiconductor junction, 2) Freeing electrons in semi-conductors, e.g., through light, laser or heath, and 3) Ionizing (plasma). Tunable permittivity can be realized using ferroelectric materials (tuned using an electric field/voltage). Tunable permeability can be realized using ferromagnetic materials (tuned using a magnetic field/current). Another design disclosed in this invention concerns the use of RF MEMS to adjust the position and angle of the energy sources, typically lasers, in the tunable RF mirror to adjust the impulse response, or create effects similar to an RF dish to guide the RF signal in far field, e.g., for the purpose of beam-forming. Another aspect of this invention concerns stacking several such tunable RF mirrors in parallel to provide more flexibility in realizing a desired RF channel characteristic. In particular, such a construction can be used to provide the effect of an RF dish by adjusting the energy source, typically lasers, to end their cycle such that different layers in the stacked structure act as reflectors contributing to steering the RF signal in a desired direction. Note that the path covered by a laser beam will become conductive and acts as a parasitic antenna elements and knowledge developed in the context of RF beam forming using parasitic elements will be applicable. Another design disclosed in this invention concerns modulating the energy source, typically laser beams, to expand their spectrum to cover a high range of frequencies. This feature helps in using the energy source with a small frequency range to the wider frequency range of the charge-releasing-object. For example, the laser's original frequency range, i.e., if excited to be always on, may be too narrow with respect to the frequency range of the charge-releasing-object, and this limits the amount of absorbed energy. Typically, a charge-releasing-object has a wider frequency range, even if it is designed to match a particular laser. For example, such a modulation can be simply a periodic switching of the laser (i.e., using a rectangular pulse train to excite the laser), or using some other time signals for switching. Another complementary option is to use several lasers, each covering part of the frequency range of the charge-releasing-object. Anti-Refection (AR) coating of parts relevant to both RF frequencies and light frequencies can be useful addition(s) to this design.

Walls of the chamber trap the RF signal and cause a varying number of reflections and delays for different parts of the RF signal before these get into the air for actual transmission (on the transmit side), or before actual reception after arriving from the air (on the receive side). In this sense, this construction acts as a wave-guide and consequently can rely on structures known in the context of wave-guides to cause or enhance effects required in the methods of this invention for inducing channel variations. Note that such walls can be combination of static elements and some that are dynamically adjusted (tuned) at speeds required to adapt the channel impulse response (this is typically much less than the rate of signaling). Walls may have openings or be composed of pieces with different conductivity and/or permittivity and/or permeability to let some of the trapped wave to exit the chamber after delay and phase/amplitude changes caused by traveling within the chamber.

Other embodiments concern the situation that some or all the control signaling can affect the propagation environment in small increments. In this case, relying on a full duplex link, this invention includes methods to form a closed loop between a transmitter and its respective receiver wherein the control signals (affecting the channel impulse response) are adjusted relying on closed loop feedback, e.g., using methods known in the context of adaptive signal processing. The criterion in such adaptive algorithms can be maximizing desired signal, and/or minimizing interference, and/or increasing frequency selectivity for diversity purposes. In such a setup, or in other closed loop setups disclosed earlier in the context of key generation, stability may be compromised due to three closed loops. These are one local loop at each node (between transmitter and receiver in the same node due to the remaining self-interference) and the third one is the loop formed between transmitter/receiver of one node and receiver/transmitter of the other node. It should be clear to those skilled in the area that transmit gain, receive gain and gains in local loops of the two units can be adjusted to avoid such undesirable oscillations.

Aspects of this disclosure relate to the design of a full-duplex radio. In its simplest from, a full-duplex radio has separate antennas for transmission and reception. The transmit and receive antennas may often be placed in the vicinity of each other and consequently a strong self-interference may be observed at the receive antenna. The description herein illustrates systems and methods for practical implementation of full-duplex wireless using a primary transmit signal and auxiliary transmit signal to reduce interference, and a residual self-interference cancellation signal. To this aim, new self-interference cancellation techniques are deployed.

In one embodiment, a method of full-duplex communication may comprise: in a full duplex transceiver, generating an interference-reduced signal by combining an analog self-interference cancellation signal to an incoming signal that includes a desired signal and a self-interference signal, wherein the analog self-interference cancellation signal destructively adds to the self-interference signal to create a residual self-interference signal. Then, the method may include further processing the interference-reduced signal to further reduce the residual self-interference signal using a baseband residual self-interference channel estimate.

In a further embodiment, the method may comprise: determining an estimate of a self-interference channel response from a primary transmitter of a transceiver to a receiver of the transceiver and determining an estimate of an auxiliary channel response from an auxiliary transmitter of the transceiver to the receiver. Then, the method may include determining a residual self-interference baseband channel response at a baseband processor of the receiver. Full-duplex communication is performed by preprocessing a primary transmit signal and an auxiliary transmit signal with the estimated auxiliary channel response and a negative of the estimated self-interference channel response, respectively, and transmitting the preprocessed primary transmit signal and the preprocessed auxiliary transmit signal in a transmit frequency range, while receiving a desired signal within a receive frequency range substantially overlapping the transmit frequency range, and receiving a residual self-interference signal. Further, the method may reduce the residual self-interference signal using the residual self-interference baseband channel response; and, further processing the desired signal.

In a further embodiment, an apparatus may comprise: a weight calculation unit configured to measure a self-interference channel and an auxiliary channel to obtain an estimate of the self-interference channel and an estimate of the auxiliary channel; a full-duplex transceiver having a primary transmitter, an auxiliary transmitter, and a receiver, wherein the primary transmitter and auxiliary transmitter are configured to preprocess a training sequence to generate two transmit signals such that the two transmit signals respectively traverse the self-interference channel and the auxiliary channel and combine to form an analog residual interference signal at the receiver of the full-duplex transceiver; an analog to digital converter and a receiver baseband processor at the receiver being configured to measure a baseband residual self-interference channel response by; and, the transceiver being further configured to cancel self-interference signals using the auxiliary channel and to cancel residual self-interference signals using the measured baseband residual self-interference channel response. In particular, the full-duplex transceiver may communicate in full-duplex by transmitting information in a first frequency band to a second receiver while simultaneously receiving information in the first frequency band from a second transmitter by cancelling self-interference signals using the auxiliary channel and cancelling residual self-interference signals using the measured baseband residual self-interference channel response.

Figure 13:
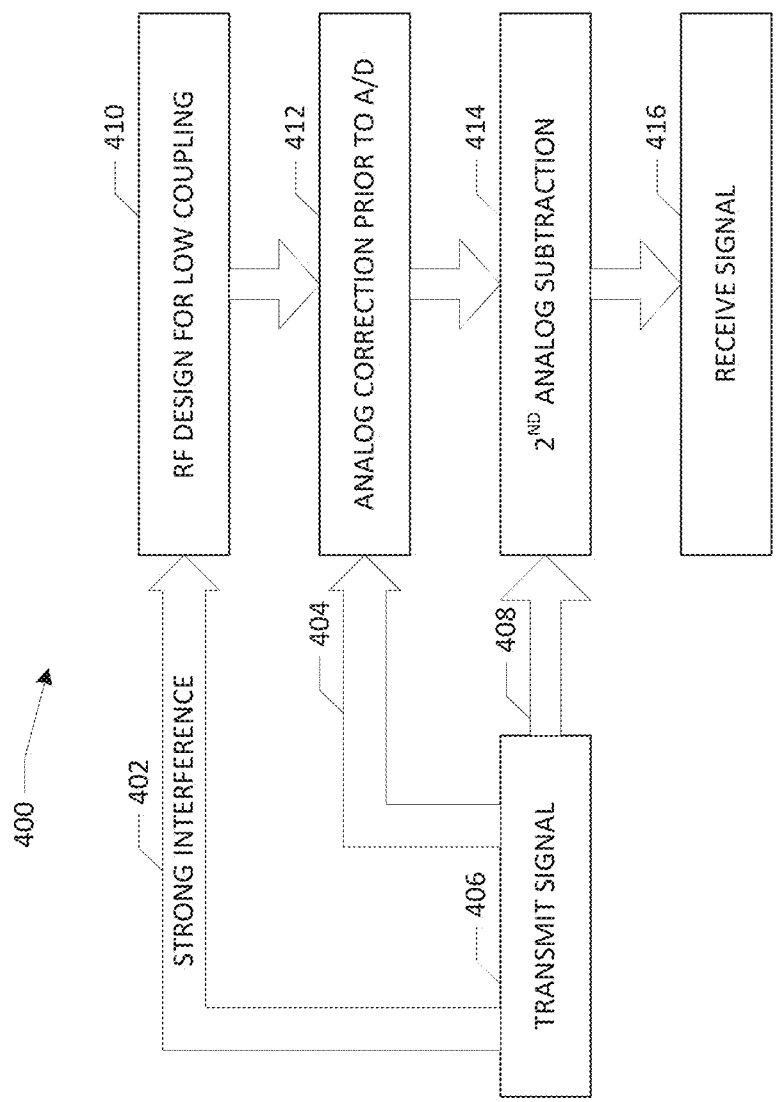
FIG. 13 shows pictorial view for a high level description for cascading several analog interference cancellation stages.

As explained herein, several techniques in RF and baseband are provided to reduce/cancel the self-interference, as shown in FIG. 13. In a first aspect 410, antenna design is employed to reduce the incidence of self-interference 402 at a full-duplex communication node 400. Symmetrical (e.g., pair-wise, triple-wise) transmit and receive antennas are relatively positioned to reduce coupling between transmit and receive and thus reduce the incidence of self-interference. Thus, to facilitate full-duplex communications, access points and clients of the communication network are configured to reduce self-interference between a component's own respective antennas and transmit and receive chains. In the case of two-dimensional structures, it is shown that there exist pairs of symmetrical antennas with substantially zero mutual coupling over the entire frequency range. To simplify implementation and also provide support for MIMO in two dimensions, various embodiments include a second class of antenna pairs with low, but non-zero coupling. This is based on placing one set of antennas in the plane of symmetry of another set. In 3-dimensions, it is shown there exist triplewise symmetrical antennas with zero coupling between any pair. It is also shown that in 3-dimensions, one can indeed find two sets of antennas (to be used for transmit and receive in a MIMO system) such that any antenna in one set is decoupled (zero coupling over the entire frequency range) from all the antennas in the second set. Furthermore, such three dimensional structures are generalized to the case that antenna arms are placed closely or merged, for example using two-sides or different layers of a PCB, or analogous approaches based on using Integrated Circuit (IC). An example for the implementation of such constructions is based on using patch antennas wherein one antenna arm is generated through reflection of the other antenna arm in the ground plane. Examples of such a construction are presented wherein the same patch is used as the transmit antenna, the receive antenna and the coupler necessary in analog cancellation. Examples are presented to generalize such constructions for MIMO transmission. Hereafter, such constructions are referred to as being in 2.5 dimensions, or simply 2.5 dimensional.

Most examples and aspects herein are described based on using separate antennas for transmit and receive. However, most of the techniques described for self-interference cancellation will be still applicable if the same antenna is used for transmit and receive. Known methods for isolating transmit and receive chains may be applied. To describe the systems and methods a basic setup is used herein. For this purpose, aspects relevant to issues like synchronization and equalization are described assuming OFDM, likewise aspects relevant to supporting multiple clients and networking are described assuming OFDMA. However, techniques herein will be applicable if OFDMA is replaced by some other known alternatives, e.g., CDMA, OFDM-CDMA, Direct Sequence (DS)-CDMA, Time-division Multiple Access (TDMA), constellation construction/transmission in time with pulse shaping and equalization, Space Division Multiple Access (SDMA), and their possible combinations.

In a second aspect 412, a corrective self-interference signal 404 is generated and injected into the receive signal at 412. Weighting coefficients for filtering are calculated for a primary transmit signal and an auxiliary transmit signal comprising the corrective self-interference signal 404. The corrective self-interference signal may be transmitted by the node to combine in the air with the signal to be received by the node's receive antenna. Transmission of the corrective self-interference signal can be at power levels comparable with the primary signal using an antenna with comparable functionality as the antenna used to transmit the primary signal. This can be the case if multiple high power transmit antennas are available in the unit. As an alternative, an auxiliary transmit antenna, with high coupling to the receive antenna, may be used to transmit the corrective self-interference signal with low power. The corrective self-interference signal may be coupled (e.g., in RF in the receive chain of the node without the use of an antenna) to the signal received by the receive antenna. In various embodiments, the analog cancellation may take place at an RF coupler 418, or alternatively it may take place at baseband frequencies using circuit 420.

As shown in FIG. 4, another technique for cancelling self-interference is to determine the response of a transmit-to-receive baseband channel, also referred to herein as a residual interference channel, or a residual self-interference baseband channel. The baseband version or frequency domain version of the transmit signal 408 may be provided to the receiver baseband processor 414 for a further analog subtraction 414 by processing the transmit signal with the residual self-interference response and then subtracting it from the incoming signal to obtain the received signal 416 prior to A/D conversion.

Figure 14:
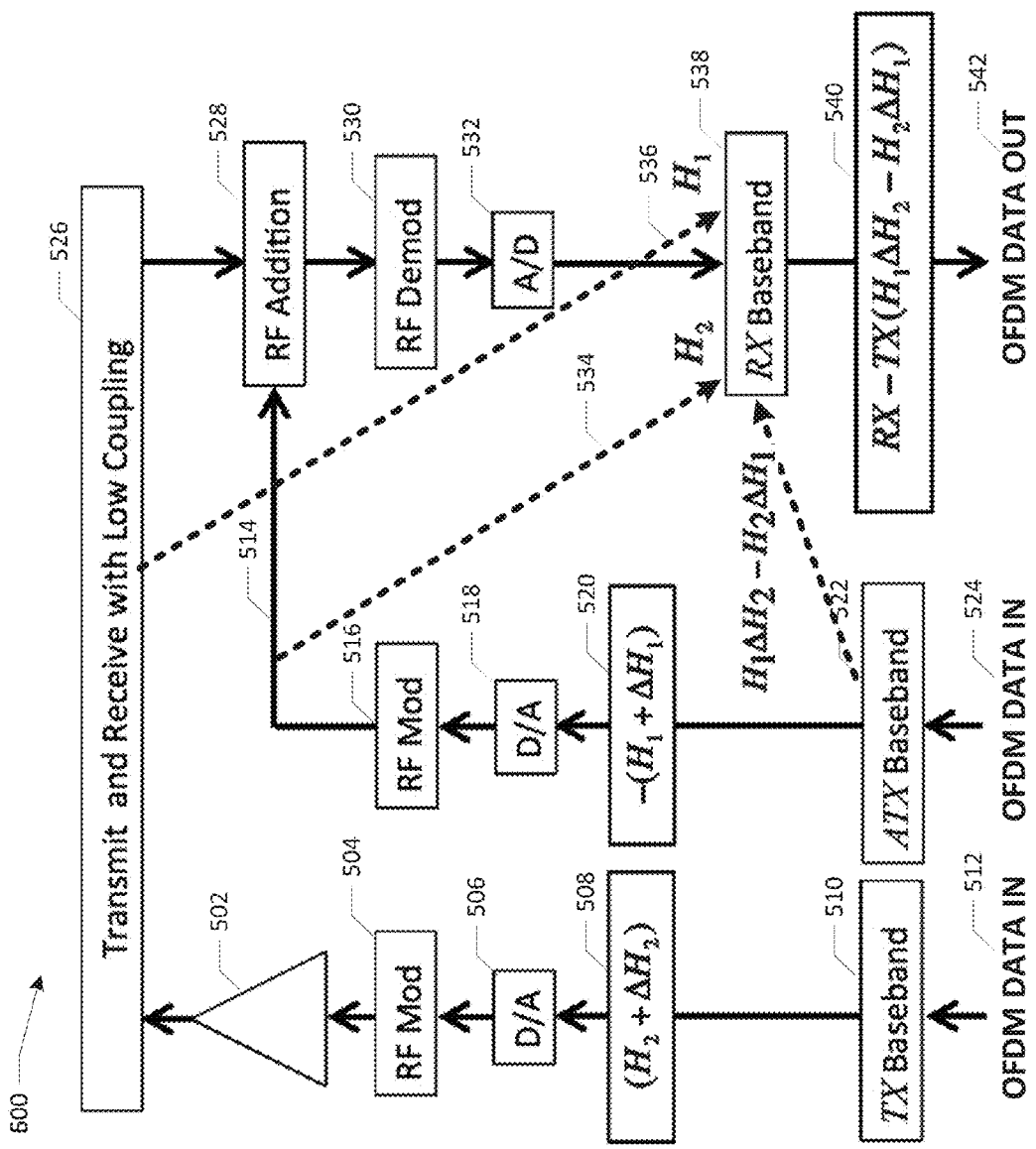
FIG. 14 shows a more detailed view for cascading several analog interference cancellation stages.

With respect to FIG. 14, one embodiment of a full-duplex transceiver is shown. OSDN data 512 is provided to the transmitter baseband processor 510. This signal will form the basis of the primary transmit signal 526 that is propagated between the transmit antenna and receive antenna with low coupling as described herein. The baseband processor 510 generates OFDM symbols for transmission and passes them to preprocessor unit 508. Preprocessor unit 508 multiplies the OFDM symbols by the transfer function $H_2$, which represents the transmission channel of the auxiliary transmit path 534. The signal is then converted to a time domain signal and passed through digital to analog converter 506. Alternatively, transmit baseband processor 510 generates the time domain signal with an IFFT module and preprocessing filter 508 is implemented in the time domain, such as by an FIR filter. The output of preprocessing unit 508 is converted to an RF signal by modulator 504, and amplified by power amplifier 502, and finally transmitted to a distant end receiver (not shown).

In the auxiliary transmit channel the OFDM data 524 is provided to the auxiliary transmit baseband processor 522. Similar to the primary transmit chain, the auxiliary preprocessor 520 may alter the OFDM symbols by an estimate of the transfer function $(-H_1)$, which is the negative of the channel response of the interference channel 536. Alternatively, the output of the auxiliary transmit baseband processor 522 may be time domain signals calculated by an IFFT module, and the preprocessor unit 520 may be an FIR filter to process signals in the time domain. The output of preprocessor 520 is provided to a digital to analog converter 518, and then to RF modulator 516, to generate the auxiliary transmit signal 514, also referred to as the self-interference cancellation signal. The self-interfering signal 526 combines with the self-interference cancellation signal 514 by way of RF addition 528.

In the embodiment of FIG. 14, the self interference is cancelled by determining the characteristics, or frequency response, of (i) the self-interference channel $H_1$ caused by the primary transmit signal as coupled through the primary transmit antenna and the receive antenna, and (ii) the self-interference cancellation channel $H_2$ caused by the auxiliary transmit path, which conveys the self interference cancellation signal. The channel responses may be determined by channel sounding techniques, including transmitting predetermined tones and measuring the magnitude and phase variations of the tones in the received signal. Note that the channel responses $H_1$ and $H_2$ are the responses of the complete channel from the OFDM data at the respective transmitters through their respective chains, through the analog signal propagation/RF channels, the receiver analog front end, all the way to the receiver baseband 538. The cancellation effect in the embodiment of FIG. 5 is due to the concatenation of the two channel responses in the primary transmit chain ($H_2$ from preprocessor 508, and $H_1$ from the remainder of the transmission path), and the negative of the concatenation of the two channel responses in the auxiliary transmit chain ($-H_1$ by preprocessor 520, and $H_2$ from the remainder of the auxiliary transmission path). Because of these two concatenations performed by the respective transmission/reception chains, the self-interference signal 526 is substantially reduced by the negative contribution of the self-interference cancellation signal 514, by way of RF addition 528. The remaining received signal is then demodulated by RF demodulator 530, and is sampled by analog-to-digital converter 532. The sampled signal is then processed by receive baseband processor 538/540. Receive baseband processor 538/540 performs an FFT to generate the OFDM symbols 542. Note that both preprocessors 602, 604 may apply the channel responses by operating directly on the OFDM transmit signals by altering the magnitude and phase of the symbols according to the channel response. Alternatively, the preprocessing may be performed in the time domain.

Note that in FIG. 14, it is recognized that the self-interference channel $H_1$ and the self-interference cancellation channel $H_2$ as determined by the full-duplex transceiver are only estimates of the actual channel responses and may include errors $\Delta H_1$ and $\Delta H_2$, respectively, as shown in preprocessing units 508, 520. After the concatenations of the primary transmit signal and the auxiliary transmit signal with their counter channel responses, a residual interference signal remains after the RF addition. This residual signal is separately measured at the receiver baseband processor, as described more fully below, and is referred to herein as the residual self-interference baseband channel response. Note that both preprocessors may apply the channel responses by operating directly on the OFDM transmit signals by altering the magnitude and phase of the symbols according to the channel response. Alternatively, the preprocessing may be performed in the time domain.

Figure 15:
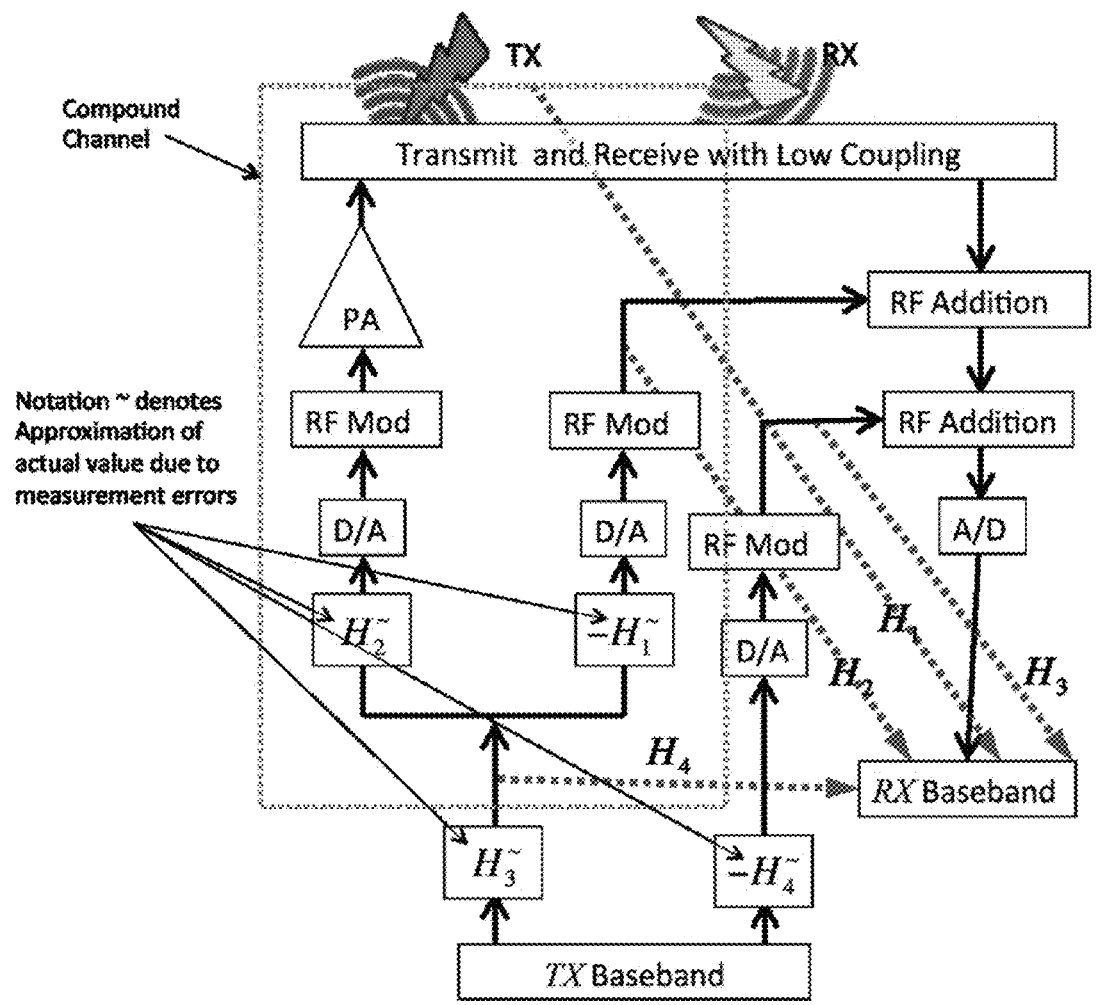
FIG. 15 shows that, to reduce delay, the cascaded analog interference cancellations can be implemented in the time domain, wherein underlying filter structures can be computed by training in the frequency domain.
Figure 18:
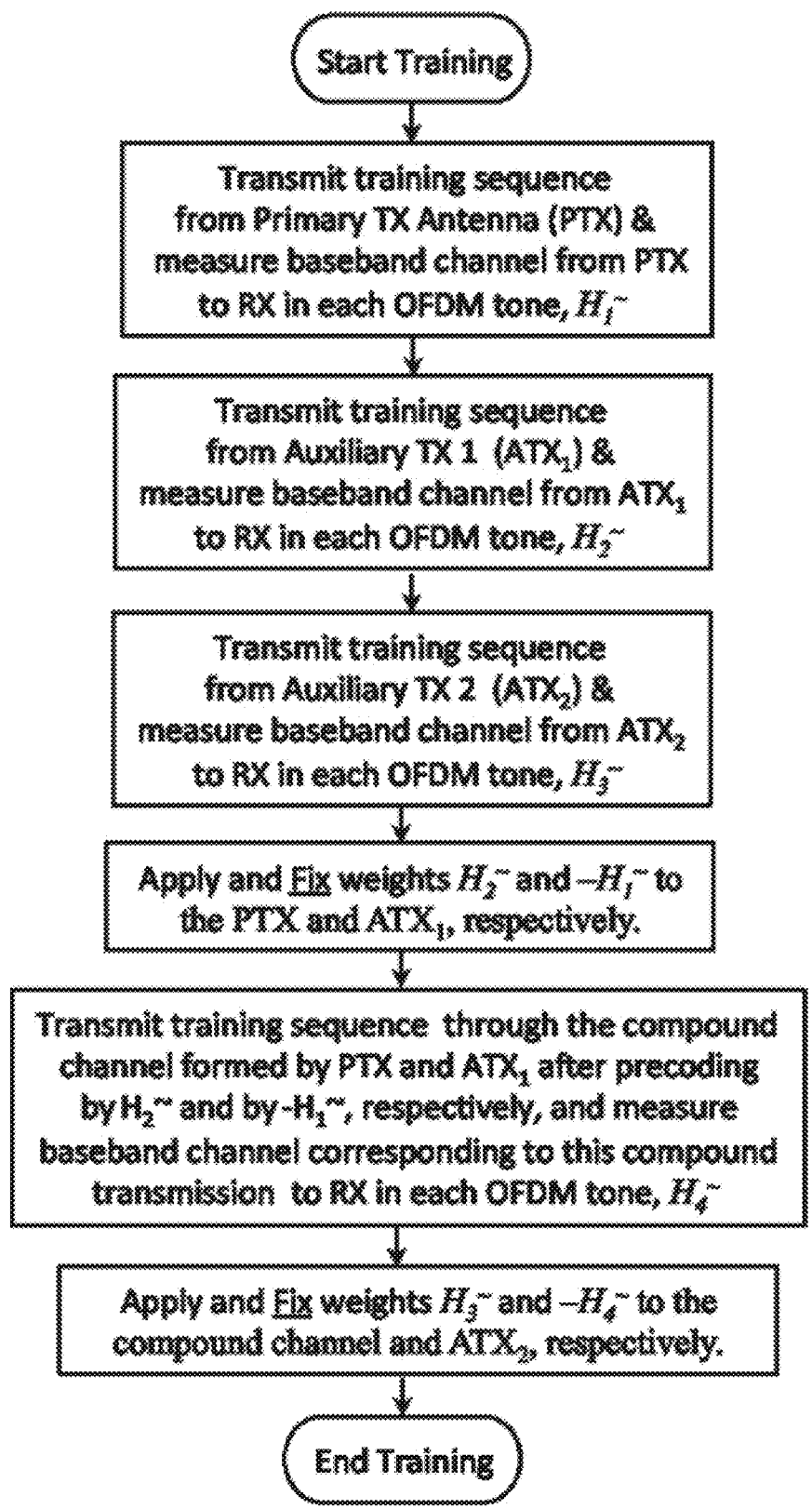
FIG. 18 shows the flow chart for the training to compute the filters used in the cascaded analog interference cancellation scheme.

FIG. 15 shows a further alternative embodiment where the residual error channel is measured and is then cancelled using a second auxiliary transmit channel for cancellation in the analog domain. This allows the residual error signal to be removed in in the time domain without having to go through an OFDM symbol time.

FIGS. 16 and 17 show block diagrams representing transmit and receive chains, in accordance with examples of embodiments of the full-duplex transceivers. These embodiments differ in the method used to construct the axillary corrective signal from the main transmit signal and the method used to couple (add) the corrective signal with the incoming signal. In some embodiments, the cancellation in analog domain due to the corrective signal is performed prior to Low-Noise-Amplifier (LNA). In another embodiment, this is done after the LNA, and before the A/D. In some embodiments, the filtering is performed in time domain. In another embodiment, filtering is performed in the frequency domain. In some embodiments compensation for amplifier nonlinearities is explicitly shown. In other embodiments compensation for amplifier nonlinearities is implicit.

The construction of a secondary (corrective) signal uses the data from the primary transmit signal and an instantaneous measurement of the self-interference channel. The corrective signal, or self-interference cancellation signal, is subtracted (in the analog domain) from the incoming signal prior to A/D. This can be achieved by using multiple, in particular two, transmit antennas with proper beam-forming weights such that their signals are subtracted in the air at the receive antenna. The antenna used to transmit the corrective signal can be a fully functional transmit antenna (similar to the other antenna used in the transmission) in the sense that it is connected to a power amplifier and has a low coupling with the corresponding receive antenna. This scenario may be of interest if there are several transmit units available which can be used in different roles depending on the mode of operation. An alternative is to use an antenna that is designed exclusively for the purpose of self-interference cancellation and consequently has a high coupling to the receive antenna and can transmit with a low power.

A different approach is based on subtracting such a corrective signal in the receive chain prior to A/D using methods for RF signal coupling. Regardless of which of the above methods for active cancellation are used, the corresponding weights may be referred to as the self-cancellation beam-forming coefficients. To improve mathematical precision by avoiding dividing of numbers, it helps if the weighting is applied to both primary and secondary, while scaling both to adjust transmit energy. However, an equivalent filtering operation can be applied to only one chain, in particular to the auxiliary corrective signal. Aspects of filtering for construction of the auxiliary corrective signal are mainly explained using frequency domain realization, however, filtering can be also performed in the time domain. In particular, it is preferred that channel impulse responses are measured in the frequency domain, and then converted to a time-domain impulse response or difference equation used to implement the filter in the time domain. Time domain filters may act continually on the signal in the time domain, or account for and compensate for the initial condition due to the filter memory from the previous OFDM symbol.

FIG. 16 shows one embodiment of a full-duplex transceiver 800. The transmit data 816 is provided to transmit baseband 814 of primary transmit chain 804, which formulates OFDM symbols and forwards them to IFFT processing unit 812 for conversion to a time domain signal. The data is then converted to an analog signal by digital to analog converter 810. The analog signal is then modulated by RF modulator 808, and amplified by power amplifier 806. The signal is then transmitted to a distant end receiver (not shown), and the transmission causes a self interfering signal 802 to be received by the receive chain 832. The transmit data 816 is also provided to auxiliary transmitter 820, where the baseband processor 830 generates OFDM symbols. The OFDM symbols are converted to a time domain signal by IFFT processor 828, and then converted to a time domain signal by digital to analog converter 826. The auxiliary transmit signal is then modulated by RF modulator 824, and amplified by amplifier 822 for transmission to the receiver chain 832 via path 818.

Note that the preprocessing of the primary transmit signal and the auxiliary transmit signal may be performed by transmit baseband processor 814 and auxiliary transmit baseband processor 830, respectively. Specifically, the TX base-band component 814 and ATX base-band component 830 receive weights from weights calculation unit 846 to perform the corrective beam forming (when transmitted for combining in the air) or signal injection (i.e. when added in RF on the unit 800).

In the embodiment 800 illustrated, the amplified signal from amplifier 804 is transmitted, via a pair-wise symmetrical transmit antenna whereas the amplified signal from amplifier 820 is output for combining with a received signal from a pair-wise symmetrical receive antenna of receiver 832 via RF coupling unit 834. A low noise amplifier 836 amplifies the combined received and injected signal. The amplified signal is demodulated (by demodulator 838) and analog to digital conversion is performed at A/D Unit 840. The digital signal is passed to FFT unit 842 and thereafter to RX base-band 844, which provides received data 848 and information (measurements) to weights calculation unit 846.

Remaining degradations in receive signal can be further reduced by forming an appropriate digital or analog corrective signal and applying it in the base-band (or IF), or even via RF transmission according to FIG. 15. This may be an attractive option to account for the degradations that are caused by non-linear operations such as rounding, lack of precision in FFT/IFFT etc.

The equivalent Transmit-to-Receive Base-band Channel (TRBC) for the remaining self-interference (residual self-interference) is measured to obtain this equivalent channel, the remaining amount of self-interference can be subtracted from the receive signal at RF.

In some embodiments, a method may comprise full duplex nodes represented as Alice and Bob configured to reduce the amount of self-interference and each node performing respective operations to exchange a key comprising:
 1. Channel values for canceling self-interference are measured (quietly by transmitting low power and possibly scrambled pilots) in each node:
 2. Each unit transmits the sum of its received signal and its input signal.
 3. Alice/Bob simultaneously sends pilots A/B, followed by −A/B, respectively;
 4. Each node obtains two equations which are used to find phase values of $AG_{12}$ and $BG_{21}$ where $G_{12}$ and $G_{21}$ are the cross gains between Alice and Bob; and,
 5. For higher security, only one of the two phase values, or a proper combination of them is used; and
 6. Channels are perturbed (at both nodes) to change the channel phase prior to a next round to determine a further key.

In further embodiments the nodes are full duplex nodes represented as Alice and Bob, each node performing respective operations to enhance security comprising:
 1. After the initial connection is established, Alice introduces a random offset in its carrier frequency for every new block of OFDM symbols;
 2. Bob transmits the periodic preamble (used in OFDM for frequency synchronization) with high power and then transmits signal from a Gaussian codebook or its practical realization containing a secret key to be used by Alice as a partial or full key in Alice's next transmission block.

In yet other embodiments, the RF channel is perturbed relying on methods known in the context of RF beamforming said methods selected from one or more of: using meta-materials, absorber/reflector surfaces, Ferroelectric materials, changing conductivity of semi-conductors by applying voltage or other forms of energy including light, electronically controlled antennas e.g., by changing impendence through switching of conducting pieces of metals, optically controlled antennas, ferrite-type dielectric antennas, and plasma antennas.

In some embodiments, the RF channel is perturbed by surrounding the antennas with walls composed of plates that have a conductive surface which is transparent to RF signal at the carrier frequency of interest, e.g., by using periodic structures, and each wall has two such plates filled with a dielectric in between, with both of the two plates separated from the dielectric material using a layer of non-conducing material, and where the RF property of the dielectric are changed by applying voltage across the two plates forming each wall.

Further embodiments include an RF channel perturbed by surrounding the antennas with walls composed of plates that have a conductive surface which is transparent to RF signal at the carrier frequency of interest, e.g., by using periodic structures, and each wall has two such plates filled with a semi-conductor in between, with one or both of the two plates separated from the semi-conductor material using a layer of non-conducing material, and where the density of charge on the surface of the semi-conductor is changed by applying voltage across the two plates forming each wall.

Further embodiments include an RF channel perturbed by surrounding the antennas with walls composed of plates that have a conductive surface which is transparent to RF signal at the carrier frequency of interest, e.g., by using periodic structures, and each wall is connected to a layer of semi-conductor, with a layer of non-conducing material in between, similar to what is used in metal-oxide-semiconductor, and where the density of charge in the semi-conductor is changed by applying voltage across each wall to adjust the level of reflection for the RF signal.

Further methods may use a full duplex link to form a closed loop between a transmitter and its respective receiver wherein the control signals (affecting the channel impulse response) are adjusted relying on closed loop feedback, e.g., using methods known in the context of adaptive signal processing. Still further embodiments include a wireless communication node configured to perform a method according to any one of the previous method claims.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
at a first transceiver, transmitting a plurality of signals to a second transceiver and receiving corresponding receive signals from the second transceiver, wherein each transmitted signal is sent using a respective channel-perturbation-induced phase characteristic;
measuring a plurality of round-trip phase values, wherein each round-trip phase value is a phase difference between one of the plurality of transmitted signals and corresponding receive signal, each round-trip phase value being dependent upon at least the respective channel-perturbation-induced phase characteristic;
masking symbols of a subsequent phase modulated signal at the first transceiver by using the plurality of measured round-trip phase values to change the phase of the symbols of the subsequent phase modulated signal.

2. The method of claim 1 wherein the first and second transceiver are full-duplex nodes.

3. The method of claim 1 wherein the first transceiver acts as a full-duplex repeater for a plurality of signals initiated by and transmitted from the second transceiver.

4. The method of claim 1 wherein the subsequent phase modulated signal is an encryption key.

5. The method of claim 4, wherein the encryption key is encoded with an error-correction code, and wherein the plurality of round-trip phase values includes phase noise that is corrected using the error-correction code.

6. The method of claim 1 wherein the channel is perturbed using radio frequency mirrors to alter antenna environments.

7. The method of claim 1 wherein the first transceiver is full duplex, and wherein symmetrical antenna structures are used to reduce coupling and self-interference, and wherein a cascade of multiple analog cancellation is used to further reduce coupling and self-interference.

8. The method of claim 7 wherein the first transceiver performs calibration to measure its internal phase.

9. The method of claim 7 wherein the first transceiver measures the filters to be used in the cascaded analog cancellation using a low power pilot.

10. The method of claim 7 wherein the first transceiver acts as the master and transmits a sinusoidal signal of a known frequency and the second transceiver relays this signal sample by sample back to the first transceiver.

11. The method of claim 1 wherein the first transceiver accounts for an internal phase shift by subtracting a value of the internal phase shift from each of the plurality of round-trip phase values as the mask.

12. A method comprising:
in a first channel state, transmitting at least one symbol at a first transceiver and measuring a first relative phase of at least one returned symbol;
receiving at least one symbol originating from a second transceiver at the first transceiver and retransmitting the at least one received symbol in the first channel state;
perturbing the channel at the first transceiver from a first channel state to a second channel state to change the channel phase;
in the second channel state, transmitting at least one additional symbol and measuring a second relative phase of at least one additional returned symbol;
receiving at least a second symbol originating from the second transceiver at the first transceiver and retransmitting the at least second received symbol in the second channel state; and,
masking symbols in a subsequent phase modulated signal transmitted by the first transceiver by using the measured first relative phase and the measured second relative phase to change the phase of the symbols of the subsequent phase modulated signal.

13. The method of claim 12, wherein the subsequent phase modulated signal is an encryption key encoded with an error-correction code.

14. The method of claim 12 wherein the first and second transceiver are full-duplex nodes.

15. The method of claim 12 wherein the first transceiver acts as a full-duplex repeater for a plurality of signals initiated by and transmitted from the second transceiver.

16. The method of claim 12 wherein the channel is perturbed using radio frequency mirrors to alter antenna environments.

17. The method of claim 12 wherein the first transceiver is full duplex, and wherein symmetrical antenna structures are used to reduce coupling and self-interference, and wherein a cascade of multiple analog cancellation is used to further reduce coupling and self-interference.

18. The method of claim 12 wherein the first transceiver performs calibration to measure its internal phase.

* * * * *